US009614447B2

(12) United States Patent
Liu

(10) Patent No.: US 9,614,447 B2
(45) Date of Patent: Apr. 4, 2017

(54) CONTROL CIRCUITS AND METHODS FOR ACTIVE-CLAMP FLYBACK POWER CONVERTERS

(71) Applicant: Fairchild (Taiwan) Corporation, Taipei (TW)

(72) Inventor: Yen-Ming Liu, Shetou Township, Changhua County (TW)

(73) Assignee: FAIRCHILD (TAIWAN) CORPORATION, Taipei (TW)

( * ) Notice: Subject to any disclaimer, the term of this patent is extended or adjusted under 35 U.S.C. 154(b) by 0 days.

(21) Appl. No.: 14/844,913

(22) Filed: Sep. 3, 2015

(65) Prior Publication Data

US 2017/0070152 A1  Mar. 9, 2017

(51) Int. Cl.
*H02M 3/335* (2006.01)

(52) U.S. Cl.
CPC .................. *H02M 3/33515* (2013.01)

(58) Field of Classification Search
CPC ......... H02M 3/33507; H02M 3/33515; H02M 3/33523; H02M 3/33561; H02M 3/33576; H02M 3/33592; H02M 2001/0032; Y02B 70/1433; Y02B 70/1441; Y02B 70/1475
USPC ............................................. 363/21.01–21.18
See application file for complete search history.

(56) References Cited

U.S. PATENT DOCUMENTS

| 5,570,278 A | 10/1996 | Cross | |
|---|---|---|---|
| 7,923,939 B1 * | 4/2011 | Hamdad | H05B 41/3927 315/209 R |
| 2010/0067259 A1 * | 3/2010 | Liu | H02M 3/33569 363/21.01 |
| 2015/0357904 A1 * | 12/2015 | Odell | H03K 17/284 363/21.13 |

FOREIGN PATENT DOCUMENTS

CN    101572490    11/2009

* cited by examiner

Primary Examiner — Yemane Mehari
(74) Attorney, Agent, or Firm — McClure, Qualey & Rodack, LLP

(57) ABSTRACT

A method for controlling an active-clamp flyback power converter is provided. The control method comprises: generating a first switch signal according to an output voltage and a current sensing signal, and selectively generating a second switch signal in a complementary or non-complementary control mode according to the current sensing signal and the first switch signal. The first switch signal is coupled to drive a low-side power switch for switching a transformer and the output voltage regulation of the active-clamp flyback power converter. The second switch signal is coupled to drive a high-side power switch for recycling leakage energy of the transformer and achieving a soft-switching of the low-side power switch. With the control method, the high-side power switch can adaptively switch in a complementary or non-complementary control mode depending on the output load and input voltage conditions.

19 Claims, 23 Drawing Sheets

| Zone condition | A | B | C | D | control mode for next cycle & logic equation |
|---|---|---|---|---|---|
| H → H | 1 | 1 | 1 | 1 | complementary = C + B'D |
| M → H | 0 | 1 | 1 | 1 | |
| L → H | 0 | 0 | 1 | 1 | |
| L → M | 0 | 0 | 0 | 1 | |
| L → L | 0 | 0 | 0 | 0 | non - complementary = D' + AC' |
| M → L | 0 | 1 | 0 | 0 | |
| H → L | 1 | 1 | 0 | 0 | |
| H → M | 1 | 1 | 0 | 1 | |
| M → M | 0 | 1 | 0 | 1 | no - change = A'BC'D |

FIG. 13

CONTROL CIRCUITS AND METHODS FOR ACTIVE-CLAMP FLYBACK POWER CONVERTERS

BACKGROUND OF THE INVENTION

Field of the Invention

The disclosure relates generally to power converters, and more particularly it relates to methods and circuits for adaptively controlling active-clamp flyback power converters.

Description of the Related Art

Since the functions of the electronic products are increased, a power supply is needed to provide more output energy. At the same time, consumers demand smaller electronic products, with a smaller volume and lighter weight. These trends form two requirements regarding power converters: raising the power density and improving conversion efficiency. Based on these two requirements, a large amount of active-clamp flyback converters and their derivative circuits are being applied to various power supply products due to their advantages, which include recycling the transformer leakage energy while minimizing turn-off voltage stress and having a soft-switching function for the power switch. For the conventional active-clamp flyback converters, the control scheme can only use complementary control mode or non-complementary control mode. Since these two control schemes cannot be selectively adopted in one converter, it is difficult to optimize the efficiency curve over a wide load range for universal ac input applications.

BRIEF SUMMARY OF THE INVENTION

One embodiment of an active-clamp flyback power converter is provided. The active-clamp flyback power converter comprises a transformer, an output circuit, a first switch device, a second switch device, a clamp capacitor, a current sense resistor, and a control circuit. The first switch device comprises a first switch and a parallel-connected first diode, coupled to a primary winding of a transformer and is switched according to a first switch signal to switch the transformer for regulating an output voltage of the active-clamp flyback power converter. The second switch device comprises a second switch and a parallel-connected second diode, and is switched according to a second switch signal for recycling leakage energy of the transformer and achieving a soft-switching of the first switch. The clamp capacitor is connected in series with the second switch device to develop an active-clamp circuit. The active-clamp circuit is coupled in parallel with the primary winding of the transformer. In the control circuit, a feedback and PWM control circuit is used to generate the first switch signal according to the output voltage and a current sensing signal, and a second switch signal control circuit selectively generates the second switch signal in a complementary control mode or a non-complementary control mode according to the current sensing signal and the first switch signal.

In an embodiment of control circuit for an active-clamp flyback power converter, the second switch signal control circuit comprises a complementary control signal generator, a non-complementary control signal generator, and a signal controller. The complementary control signal generator generates a first signal according to a first switch signal. The first switch signal is coupled to a transformer of the active-clamp flyback power converter for regulating an output voltage of the active-clamp flyback power converter. The non-complementary control signal generator generates a second signal according to the first switch signal. The signal controller receives the first signal and the second signal and is controlled by the first switch signal and a current sensing signal. The signal controller selectively outputs the first signal or the second signal to serve as a second switch signal according to the first switch signal and the current sensing signal. The second switch signal is coupled for recycling leakage energy of the transformer and achieving a soft-switching of a power switch of the active-clamp flyback power converter.

Another embodiment of control circuit for an active-clamp flyback power converter is provided. The control circuit for an active-clamp flyback power converter comprises a status detection circuit, a comparator circuit, a control mode selector, and output circuit. The status detection circuit generates a first status parameter according to a current sensing signal and a first switch signal. The first status parameter represents a current state of the active-clamp flyback power converter. The first switch signal is coupled to a transformer of the active-clamp flyback power converter for regulating an output voltage of the active-clamp flyback power converter. The comparator circuit compares the first status parameter with a first reference and a second reference, and generates a comparison result. The control mode selector generates a control signal in response to the comparison result. The output circuit receives the first signal and the second signal. The output circuit selectively outputs the first signal or the second signal to serve as the second switch signal according to the first switch signal in response to the receiving of the control signal with a high logic level or a low logic level. The second switch signal is coupled for recycling leakage energy of the transformer and achieving a soft-switching of a power switch of the active-clamp flyback power converter.

An embodiment of a control method for an active-clamp flyback power converter is provided. The control method comprises the steps of generating a status parameter according to a current sensing signal and a first switch signal, wherein the first switch signal is coupled to a transformer of the active-clamp flyback power converter for regulating an output voltage of the active-clamp flyback power converter; comparing the status parameter with a first reference and a second reference to generate a comparison result; generating a control signal according to the comparison result; and generating a second switch signal in the complementary control mode or in the non-complementary control mode according to the control signal. The second switch signal is coupled for recycling leakage energy of the transformer and achieving a soft-switching of the first switch.

A detailed description is given in the following embodiments with reference to the accompanying drawings.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 shows relationship of the next control mode and the conditions of a comparison result;

DETAILED DESCRIPTION OF THE INVENTION

Figure 1:
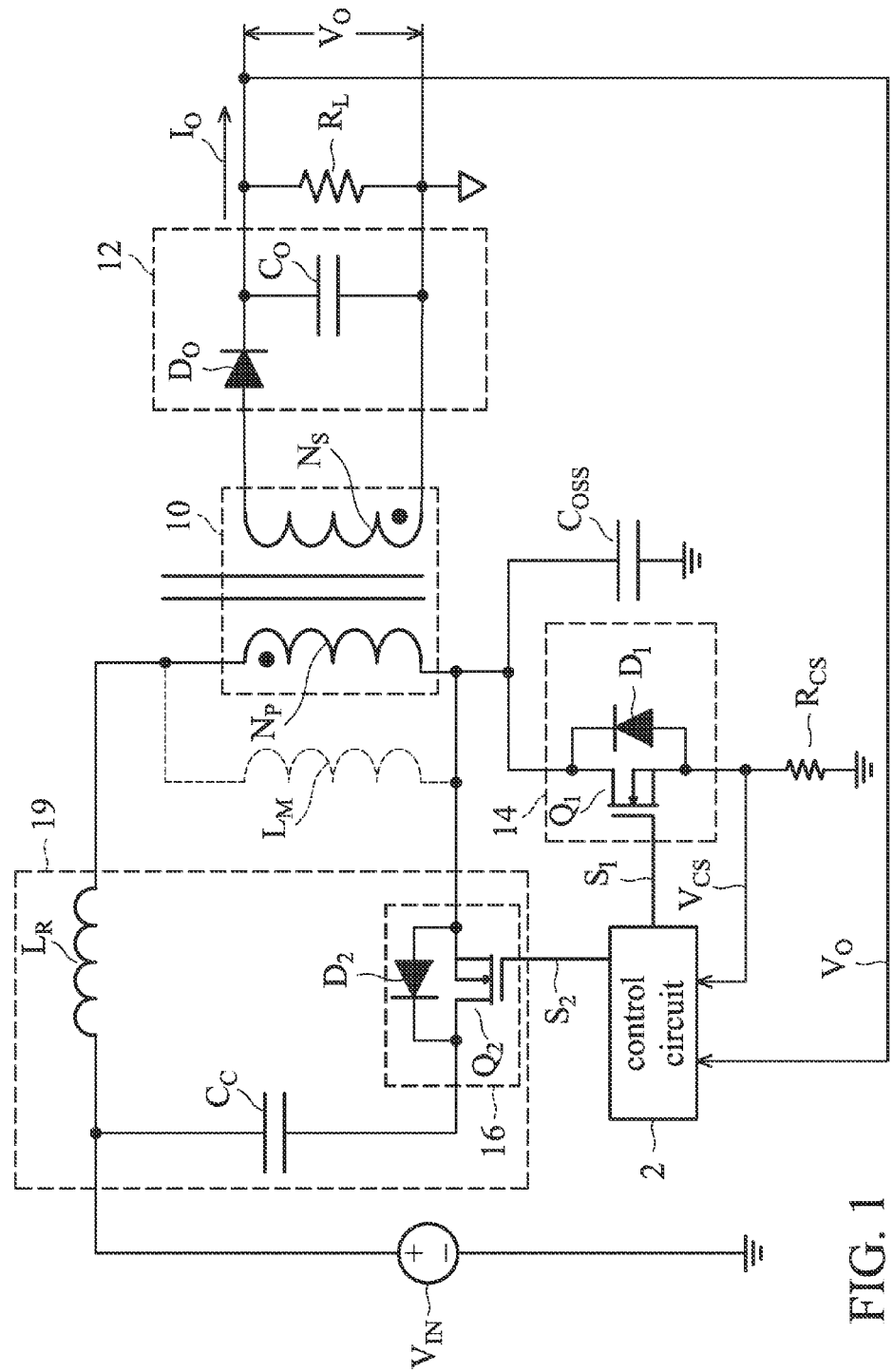
FIG. 1 is a circuit diagram of an embodiment of an active-clamp flyback converter.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a circuit diagram of an embodiment of an active-clamp flyback converter. The active-clamp flyback converter according to an embodiment comprises a transformer 10, an output circuit 12, a first switch device 14, a second switch device 16, a clamp capacitor $C_C$, a current sense resistor $R_{CS}$ and a control circuit 2. The transformer 10 is coupled to receive an input voltage $V_{IN}$ of the power converter. The transformer 10 comprises a primary winding $N_P$ and a secondary winding $N_S$, and generates an output current $I_O$ and an output voltage $V_O$ for a loading $R_L$ via a rectifier $D_O$ and a capacitor $C_O$ of an output circuit 12. The output circuit 12 is coupled to the secondary winding $N_S$ of the transformer 10 and outputs the output current $I_O$ and the output voltage $V_O$.

The first switch device 14 comprises a first switch(referred to as "power switch") $Q_1$ and a parallel-connected first diode $D_1$. The first switch device 14 is coupled to the primary winding $N_P$ of the transformer 10 and is switched according to a first switch signal $S_1$ to switch the transformer 10. In an embodiment of the disclosure, the first switch $Q_1$ can be implemented by a transistor, for example, an NMOS transistor. As the first switch $Q_1$ is an NMOS transistor, the gate of the first switch $Q_1$ receives the first switch signal $S_1$, the drain of the first switch $Q_1$ is coupled to the primary winding $N_P$ of the transformer 10, and the source of the first switch $Q_1$ is coupled to ground via the current sense resistor $R_{CS}$. The anode of the first diode $D_1$ is coupled to the source of the first switch $Q_1$ and the cathode of the first diode $D_1$ is coupled to the drain of the first switch $Q_1$. In an embodiment, the first diode $D_1$ can be a body diode of the NMOS transistor. In other words, the first switch device 14 is driven by the first switch signal $S_1$.

The second switch device 16 comprises a second switch $Q_2$ and a parallel-connected second diode $D_2$, and is switched according to a second switch signal $S_2$ for recycling leakage energy of the transformer and achieving a soft-switching of the first switch $Q_1$. In an embodiment of the disclosure, the second switch $Q_2$ can be a transistor, for example, an NMOS transistor. As the second switch $Q_2$ is an NMOS transistor, the gate of the second switch $Q_2$ receives the second switch signal $S_2$, the drain of the second switch $Q_2$ is coupled to the clamp capacitor $C_C$, and the source of the second switch $Q_2$ is coupled to a connection point of the drain of the first switch $Q_1$ and the primary winding Np of the transformer 10. The anode of the second diode $D_2$ is coupled to the source of the second switch $Q_2$ and the cathode of the second diode $D_2$ is coupled to the drain of the second switch $Q_2$. In an embodiment, the second diode $D_2$ can be a body diode of the NMOS transistor. In other words, second switch device 16 is driven by the second switch signal $S_2$.

In addition, the parasitic capacitor $C_{OSS}$ represents the sum of the equivalent parasitic capacitance of the first switch $Q_1$, the second switch $Q_2$, and the parasitic winding capacitance of the transformer 10, an inductor $L_M$ represents the transformer magnetizing inductance, and an leakage inductance $L_R$ represents the sum of transformer leakage inductance and external inductance, which forms a series resonant circuit with the parasitic capacitor $C_{OSS}$ to enable soft-switching function. The clamp capacitor $C_C$ is connected in series with the second switch device 16 and the leakage inductance $L_R$ to develop an active-clamp circuit 19 for limiting the turn-off voltage spike of the first switch signal $S_1$, and the active-clamp circuit 19 is coupled in parallel with the primary winding $N_P$ of the transformer 10.

The control circuit 2 generates the first switch signal $S_1$ to control the first switch $Q_1$ for regulating the output voltage $V_O$ of the power converter, and selectively generates the second switch signal $S_2$ in a complementary control mode or a non-complementary control mode according to a current sensing signal $V_{CS}$ and the first switch signal $S_1$. When the first switch $Q_1$ is turned on, the current flowing through the primary winding $N_P$ is detected by the current sense resistor $R_{CS}$ to generate the current sensing signal $V_{CS}$. The first switch signal $S_1$ is generated according to the output voltage $V_O$ and the current sensing signal $V_{CS}$.

FIG. 2A~FIG. 2E respectively show five states F1~F5 of a current flow of the power converter according to an embodiment of the present disclosure.

Figure 3A:
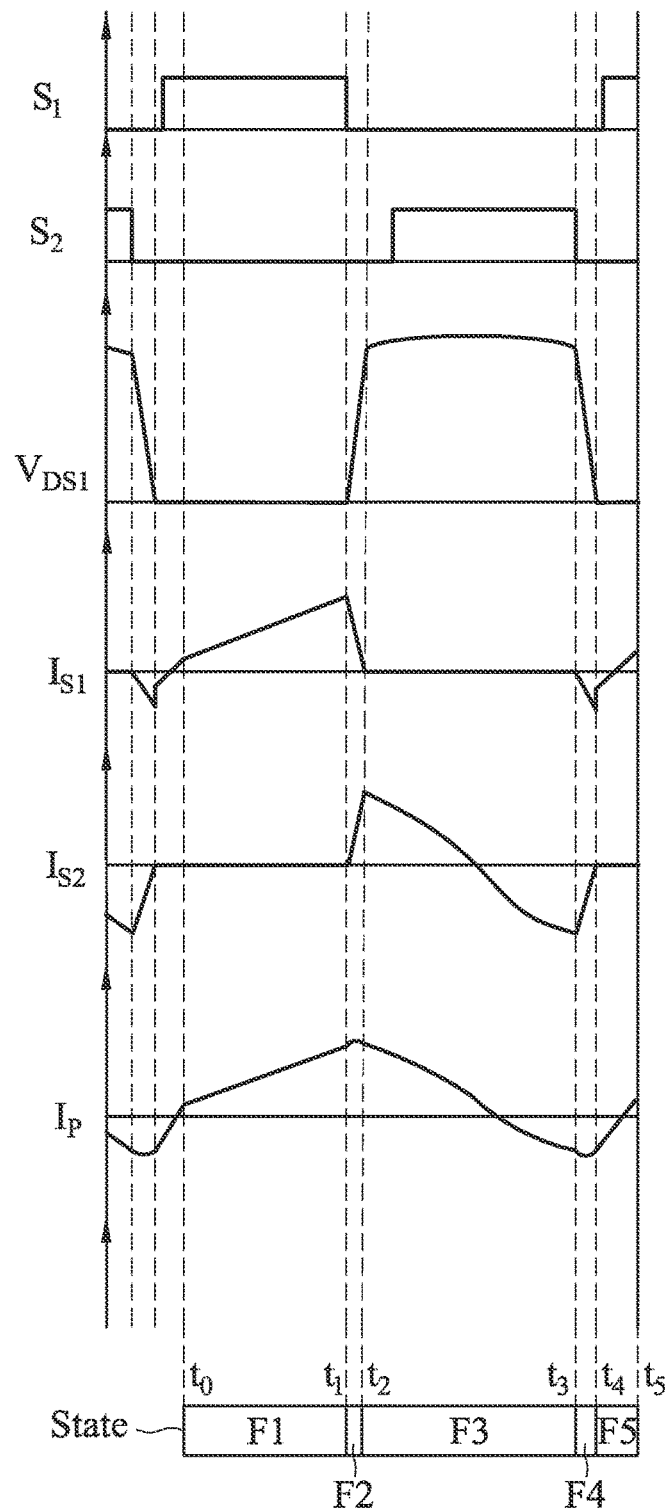
FIG. 3A and FIG. 3B respectively show an embodiment of the steady-state waveforms of a complementary control mode in a continuous conduction mode (CCM) and in a discontinuous conduction mode (DCM)
Figure 3B:
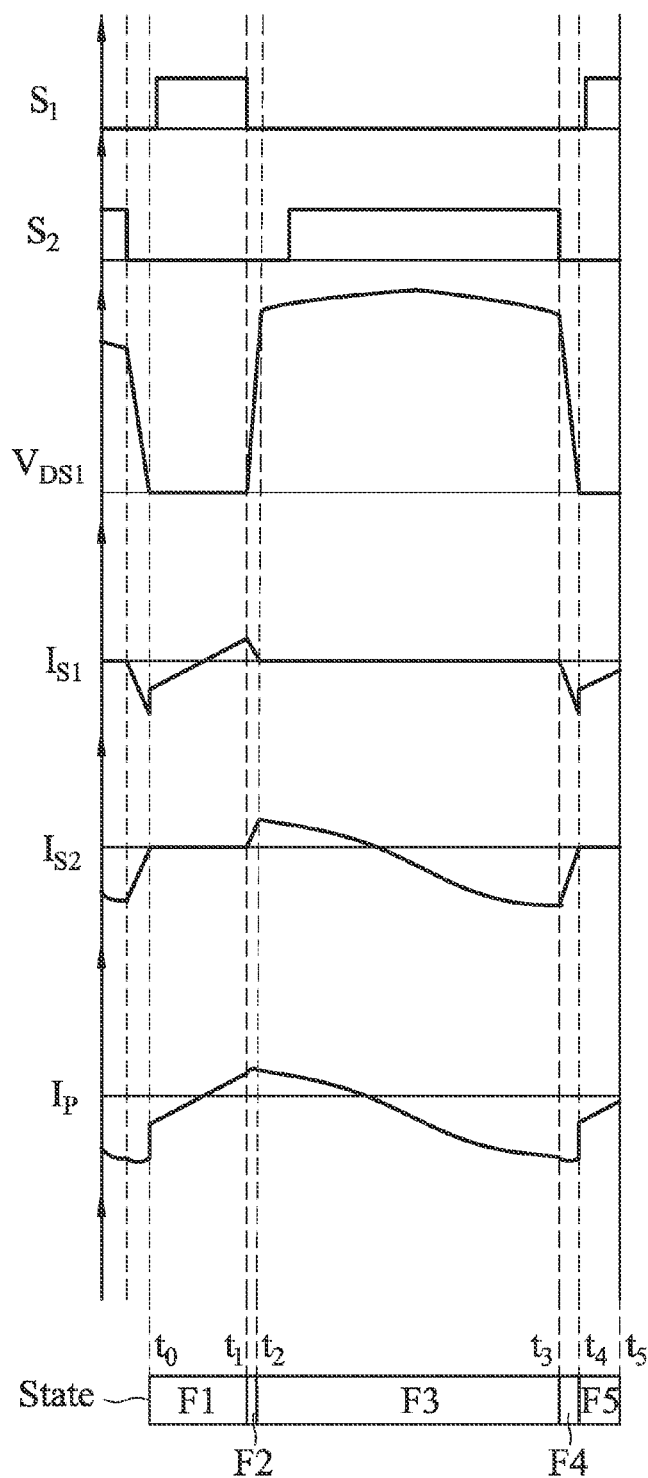

FIG. 3A and FIG. 3B respectively show an embodiment of the steady-state waveforms of a complementary control mode in a continuous conduction mode (CCM) and in a discontinuous conduction mode (DCM), wherein $V_{DS1}$ represents the voltage level between the drain and the source of the first switch $Q_1$, $I_{S1}$ represents the current through the first switch $Q_1$, $I_{S2}$ represents the current through the second switch $Q_2$, and $I_P$ represents the current flowing through the primary winding $N_P$ of the transformer 10.

Figure 2A:
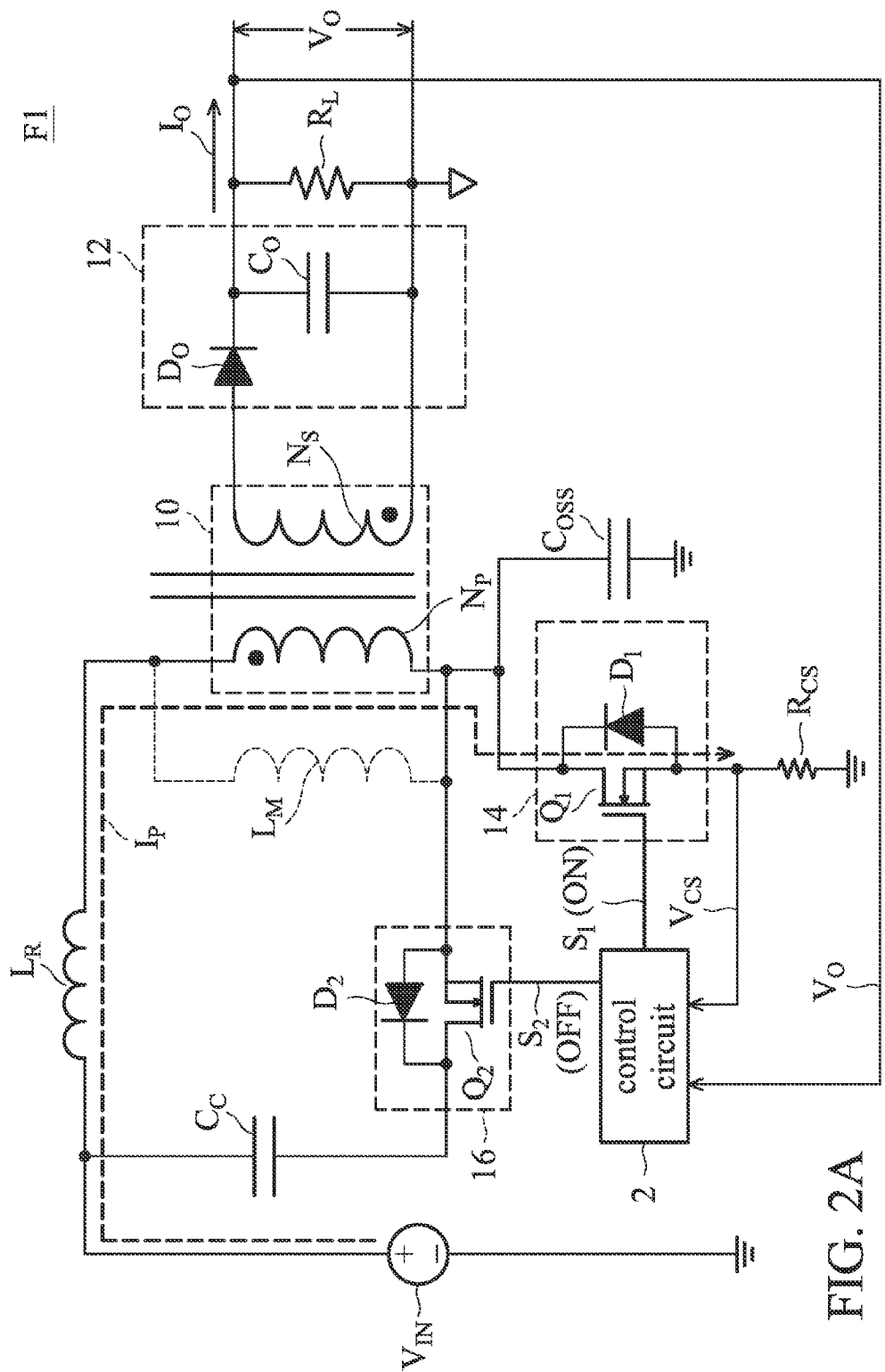
FIG. 2A~FIG. 2E respectively show five states F1~F5 of a current flow of the power converter according to an embodiment of the present disclosure.

Referring to FIG. 2A and FIG. 3A, in a state F1, the first switch $Q_1$ is in on state and the second switch $Q_2$ is in off state. The current $I_P$ flows through the transformer 10 and the first switch $Q_1$. Therefore, the energy is stored in the transformer 10 and the leakage inductance $L_R$.

Figure 2B:
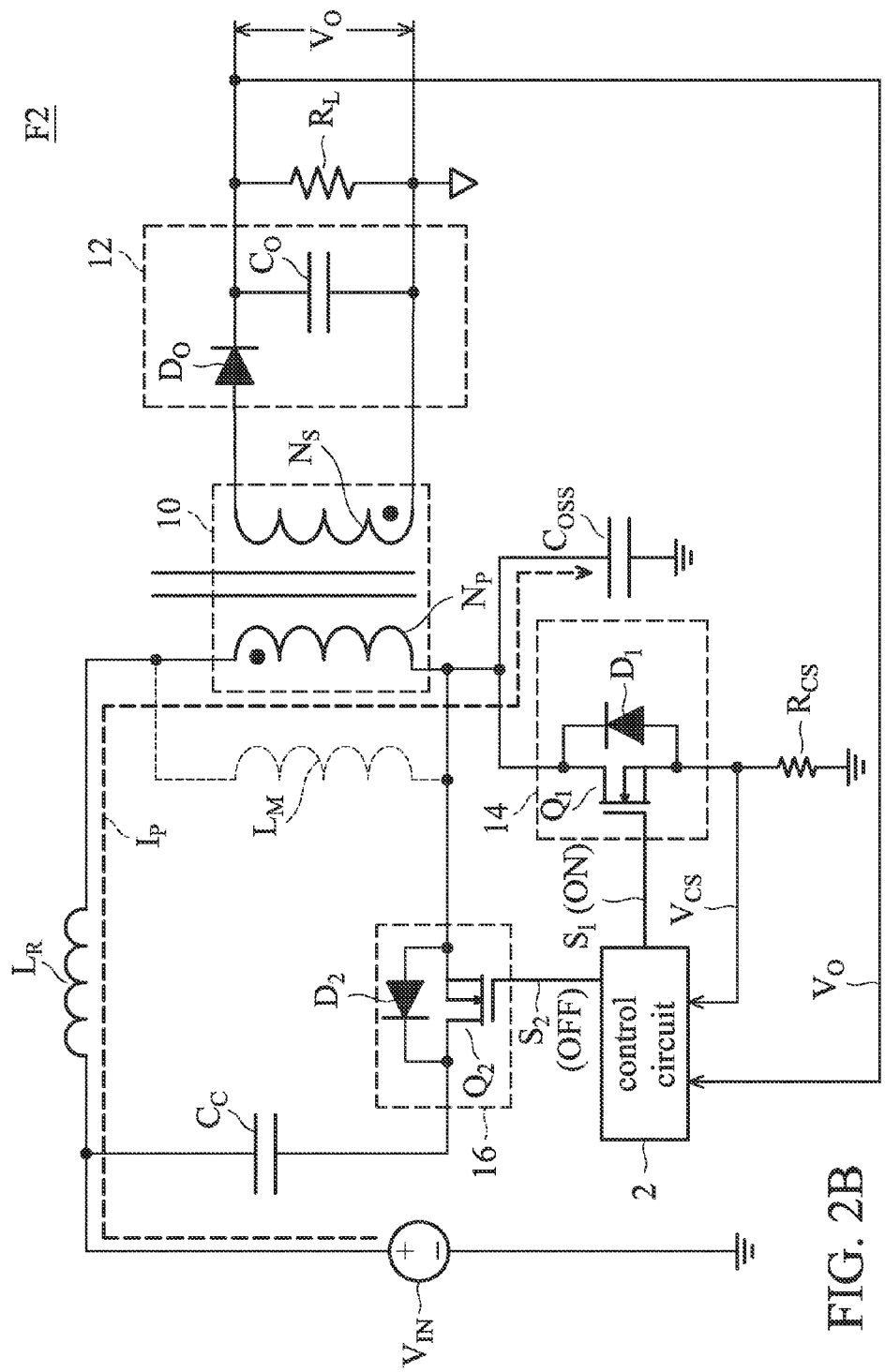

Referring to FIG. 2B and FIG. 3A, at a time point t1, the first switch signal S1 turns off the first switch Q1. The energy stored in the transformer 10 and the leakage inductance LR will be delivered to the parasitic capacitor COSS by the current IP. Since a capacitance of the parasitic capacitor COSS is very small, the parasitic capacitor COSS is rapidly charged and the voltage VDS1 rises linearly to reach Vin+Vc in a short time, wherein VDS1 represents the voltage level between the drain and the source of the first switch Q1, and Vc represents the voltage on the clamp capacitor CC. The period from the time point t1 to a time point t2 refers to as "state F2".

Figure 2C:
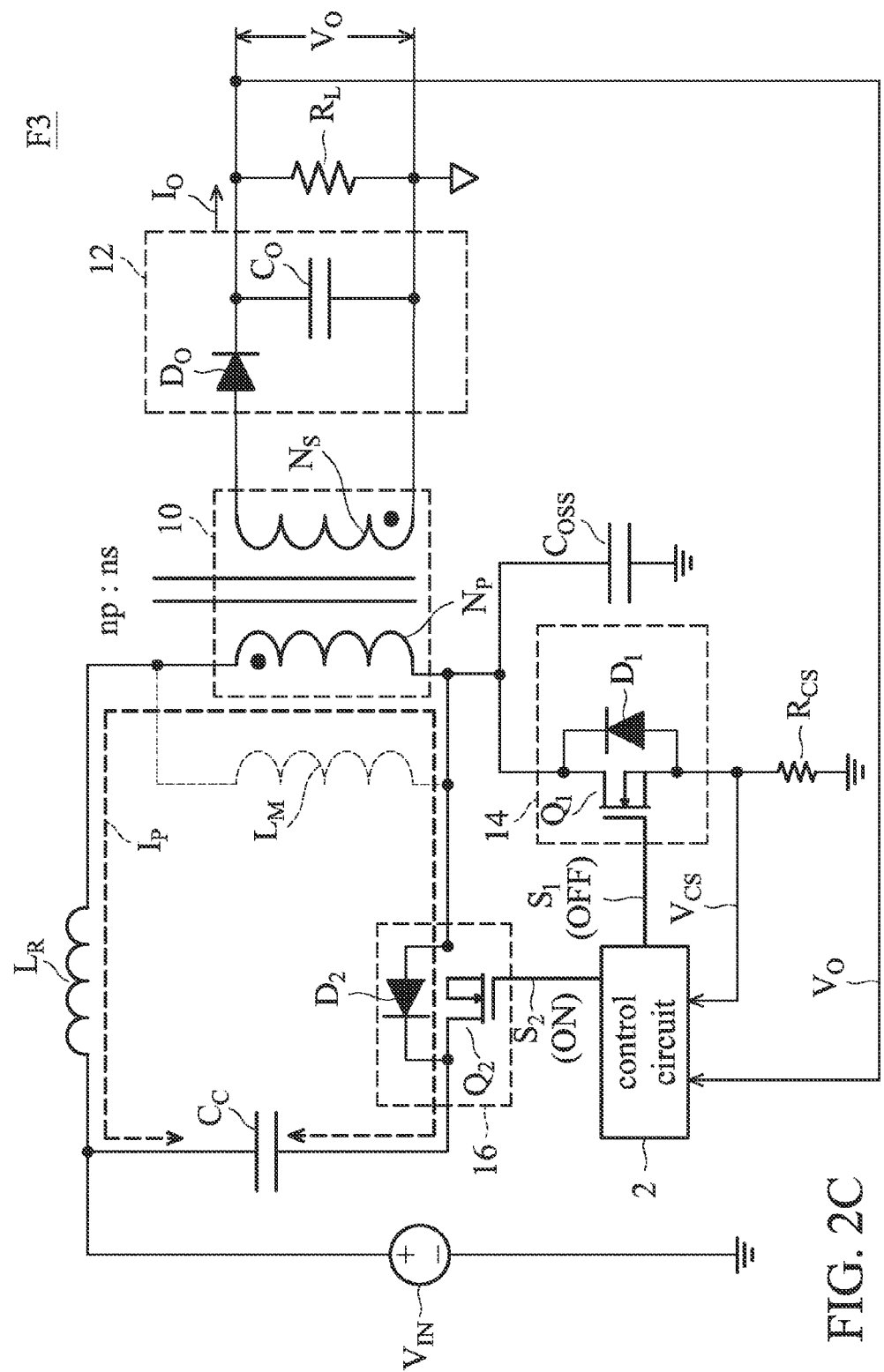

Referring to FIG. 2C and FIG. 3A, at the time point t2, the voltage VDS1 rises to the Vin+Vc that makes the body diode D2 of the second switch Q2 start to conduct. The energy stored in the transformer 10 will be delivered to the output circuit 12 of the power converter through the output current Io for generating the output voltage Vo. Besides, the energy in the leakage inductance LR will be delivered to the clamp capacitor CC through the body diode D2 of the second switch Q2. Shortly, the second switch Q2 is turned on before the current IP resonates to the negative direction; thus, zero-voltage-switching (ZVS) of the second switch Q2 is achieved. Then the energy stored in the clamp capacitor CC will be recycled to the transformer 10 and the leakage inductance LR via the second switch Q2. So, the leakage inductance LR and the clamp capacitor CC form a resonant tank and determine its resonant frequency. The period from the time point t2 to a time point t3 refers to as "state F3".

Figure 2D:
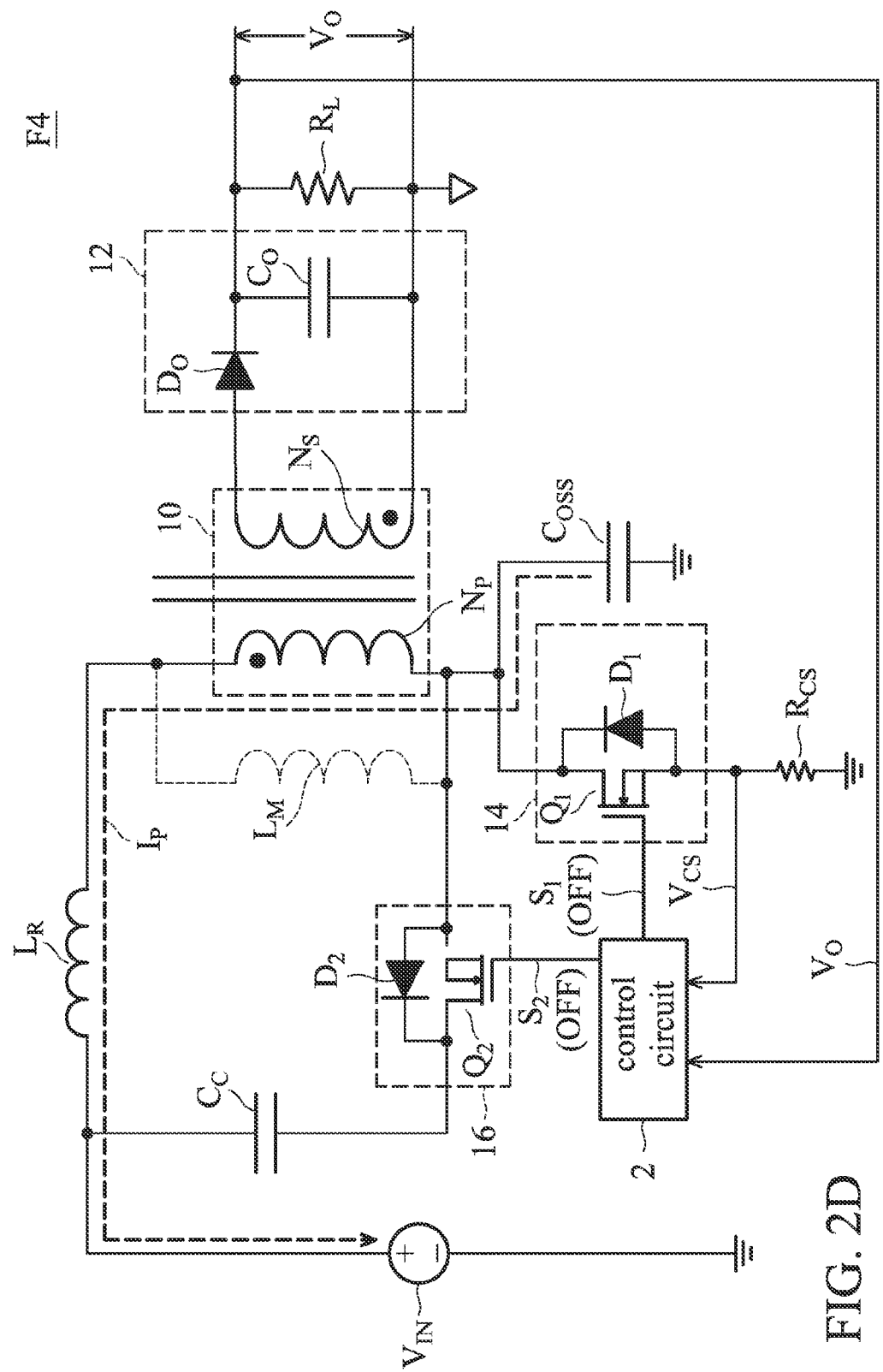

Referring to FIG. 2D and FIG. 3A, at the time point t3, the second switch signal S2 turns off the second switch Q2. The energy stored in the parasitic capacitor COSS will be delivered to the input voltage VIN through the current IP. Therefore, the voltage VDS1 can decrease from Vin+Vc to zero. The period from the time point t3 to a time point t4 refers to as "state F4".

Figure 2E:
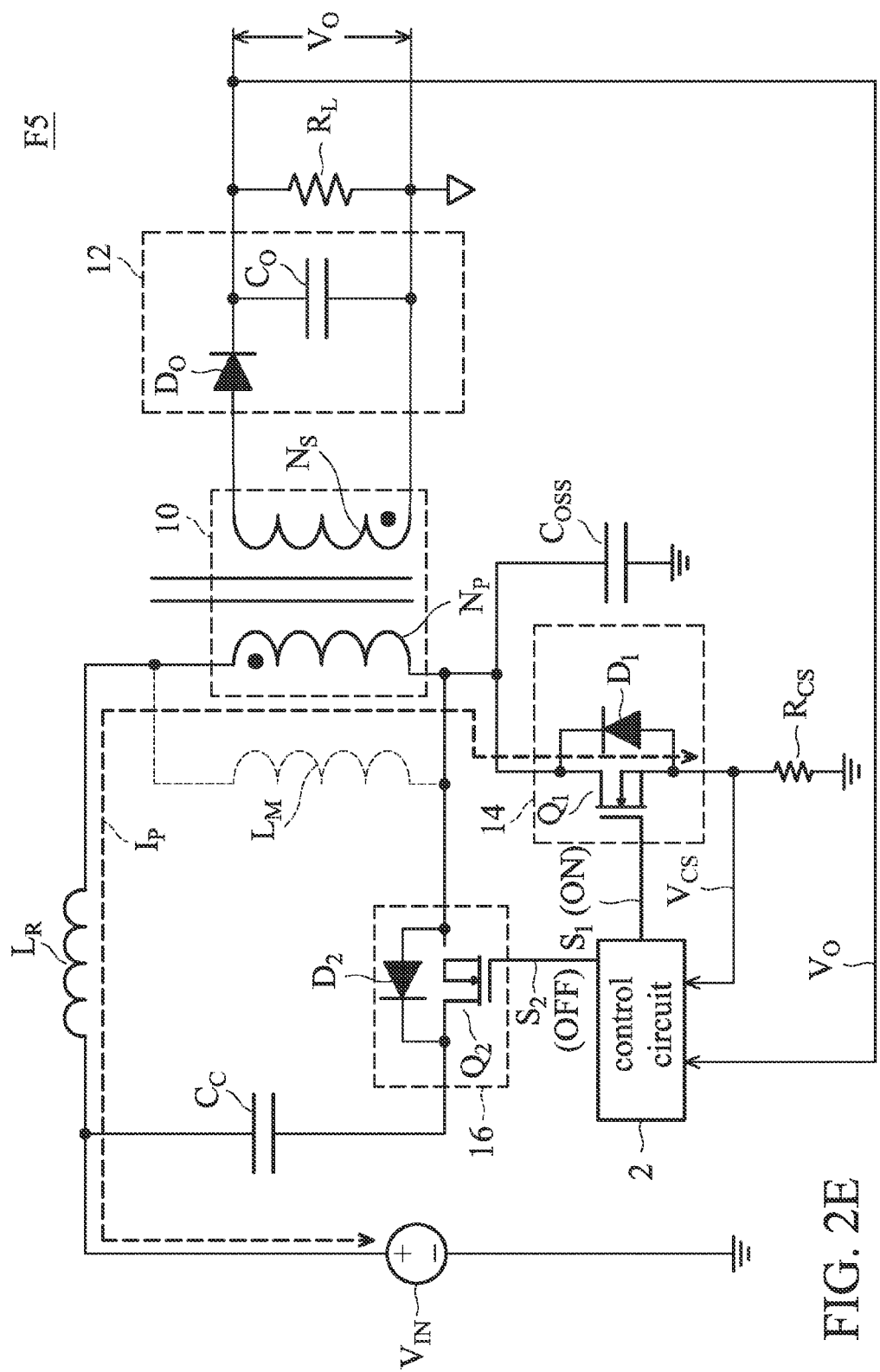

Referring to FIG. 2E and FIG. 3A, in a state F5 (from the time point t4 to a time point t5), after the parasitic capacitor $C_{OSS}$ is discharged to zero, the body diode $D_1$ of the first switch $Q_1$ is conducted. While the body diode $D_1$ is conducting, the first switch $Q_1$ is turned on to achieve zero-voltage switching operation.

The control circuit 2 controls the transformer 10 to operate in a continuous conduction mode (CCM) or in a discontinuous conduction mode (DCM) by providing the first switch signal $S_1$. In an embodiment of the disclosure, the second switch signal $S_2$, generated by control circuit 2, can selectively operate the second switch $Q_2$ in complementary control mode or non-complementary control mode.

Since the varying of the waveforms in FIG. 3B is familiar to those skilled in the art, the detailed description thereof is omitted for brevity. When operating in continuous conduction mode (CCM), shown in FIG. 3A, the condition for zero-voltage-switching (ZVS) turn-on of the first switch Q1 is that there must be sufficient energy stored in the leakage inductance $L_R$ to completely discharge the parasitic capacitance Coss, i.e. the energy stored in the leakage inductance $L_R$ exceeds that in the parasitic capacitance Coss. When operating in discontinuous conduction mode (DCM), shown in FIG. 3B, the first switch Q1 can easily achieve zero-voltage-switching (ZVS) turn-on by the negative Ip since the energy stored in the inductor $L_M$ and the leakage inductance $L_R$ is significantly greater than the energy in the parasitic capacitance Coss. However, the large negative Ip also flows through the second switch $Q_2$ and causes severe conduction loss and switching loss. The drawback will deteriorate in the high input or light-load condition.

Figure 4A:
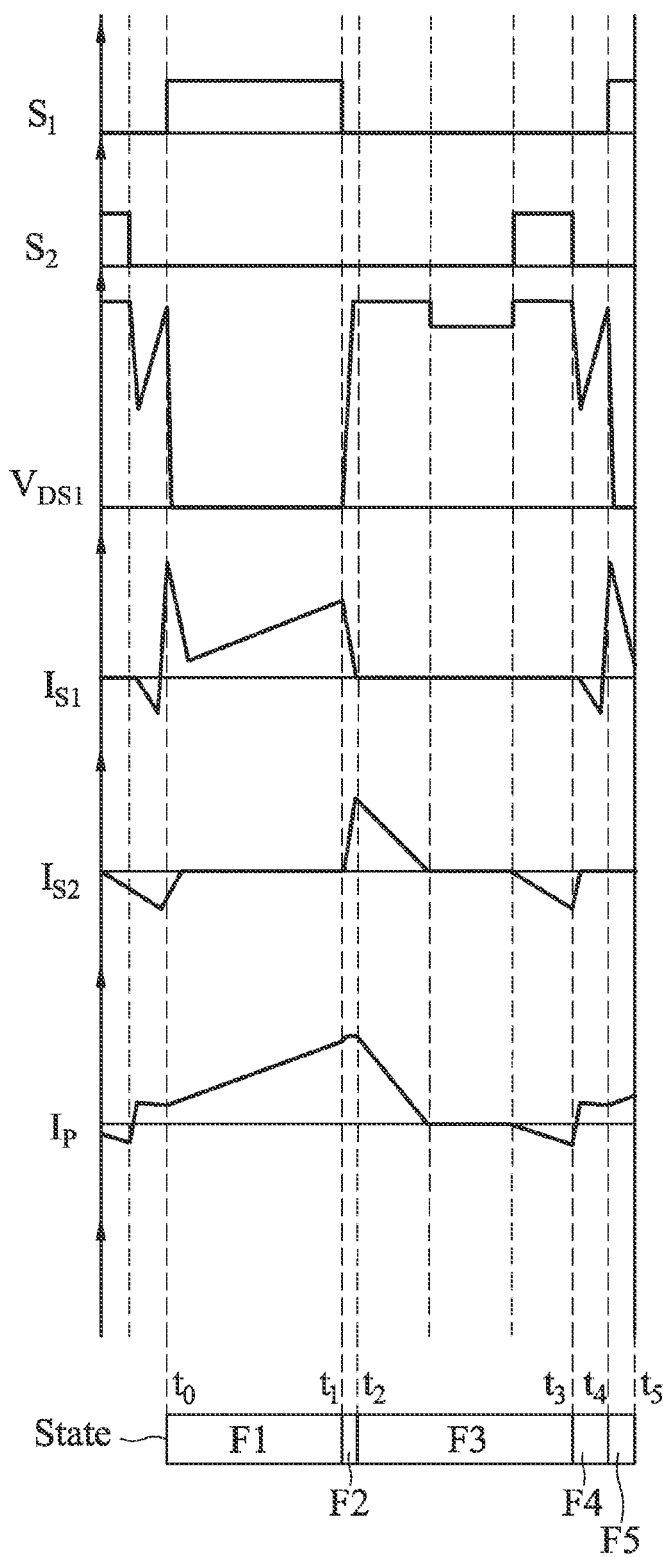
FIG. 4A and FIG. 4B respectively show an embodiment of the steady-state waveforms of a non-complementary control mode in a continuous conduction mode (CCM) and in a discontinuous conduction mode (DCM)
Figure 4B:
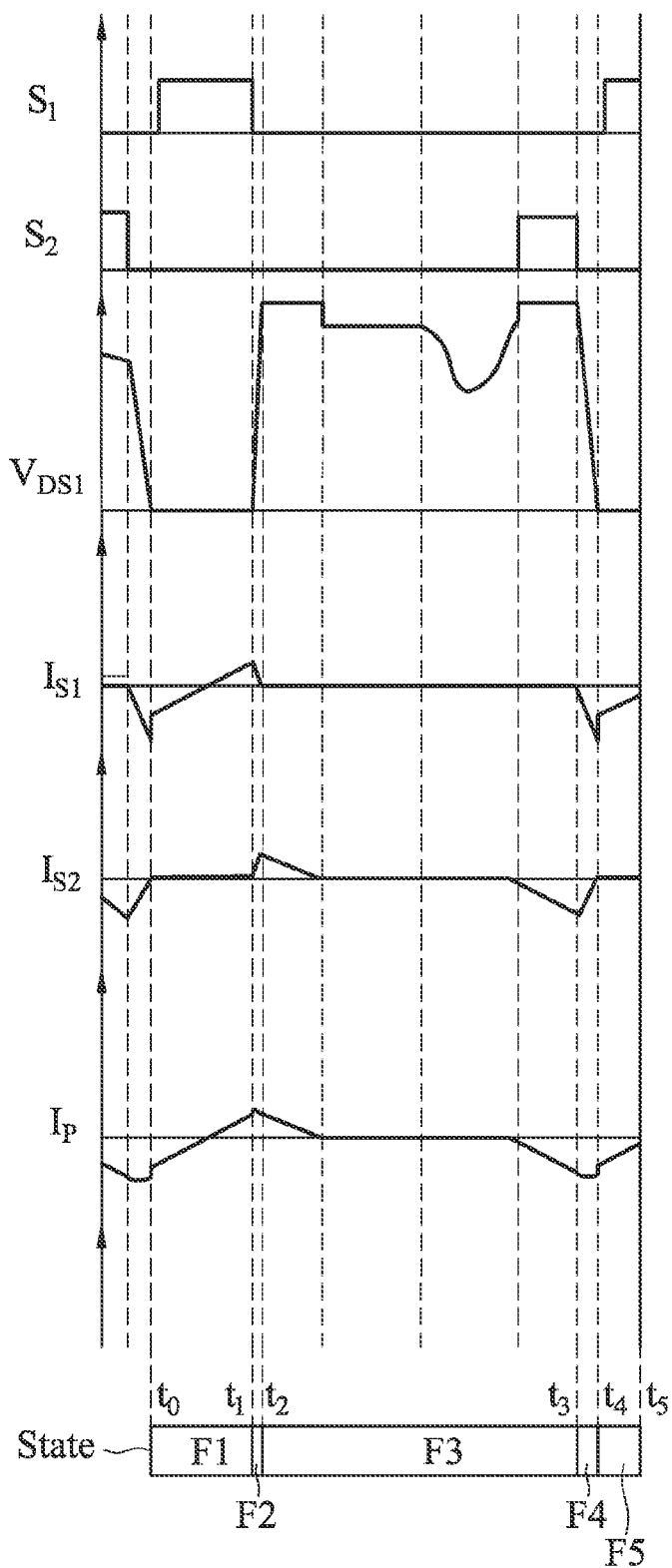

FIG. 4A and FIG. 4B respectively show an embodiment of the steady-state waveforms of a non-complementary control mode in a continuous conduction mode (CCM) and in a discontinuous conduction mode (DCM). Note that the on-time of the second switch signal $S_2$ in the non-complementary control mode is less than that in the complementary control mode. When operating in continuous conduction mode (CCM), as shown in FIG. 4A, there is usually no sufficient energy stored in the leakage inductance $L_R$ to completely discharge the parasitic capacitance $C_{OSS}$. This is because the on-time of the second switch signal $S_2$ becomes shorter so that the negative Ip is reduced as well.

When operating in discontinuous conduction mode (DCM), as shown in FIG. 4B, the first switch $Q_1$ can easily achieve zero-voltage-switching (ZVS) turn-on by the negative Ip since the energy stored in inductor $L_M$ and leakage inductance $L_R$ is greater than the energy in the parasitic capacitance $C_{OSS}$. It is worth mentioning the on-time and circulating the current of the second switch $Q_2$ are smaller compared with those of complementary control mode. So, both the conduction loss and switching loss of the second switch $Q_2$ can be reduced.

In an embodiment of the disclosure, the control circuit 2 uses an adaptive control scheme to selectively generate the second switch signal $S_2$ in a complementary control mode or a non-complementary control mode to achieve the efficiency profile optimization. In an embodiment of the disclosure, the control circuit 2 selectively generates the second switch signal $S_2$ in a complementary control mode or a non-complementary control mode according to the current sensing signal $V_{CS}$ and the first switch signal $S_1$.

Figure 5:
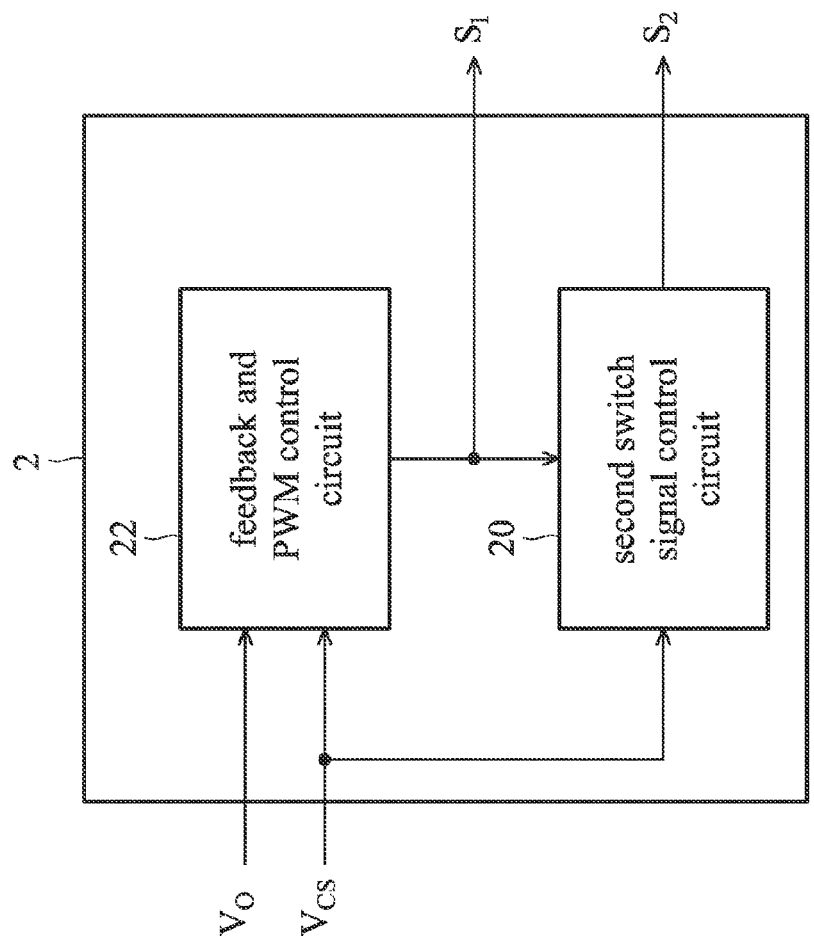
FIG. 5 is a block diagram of a control circuit according to an embodiment of an active-clamp flyback converter.
Figure 6:
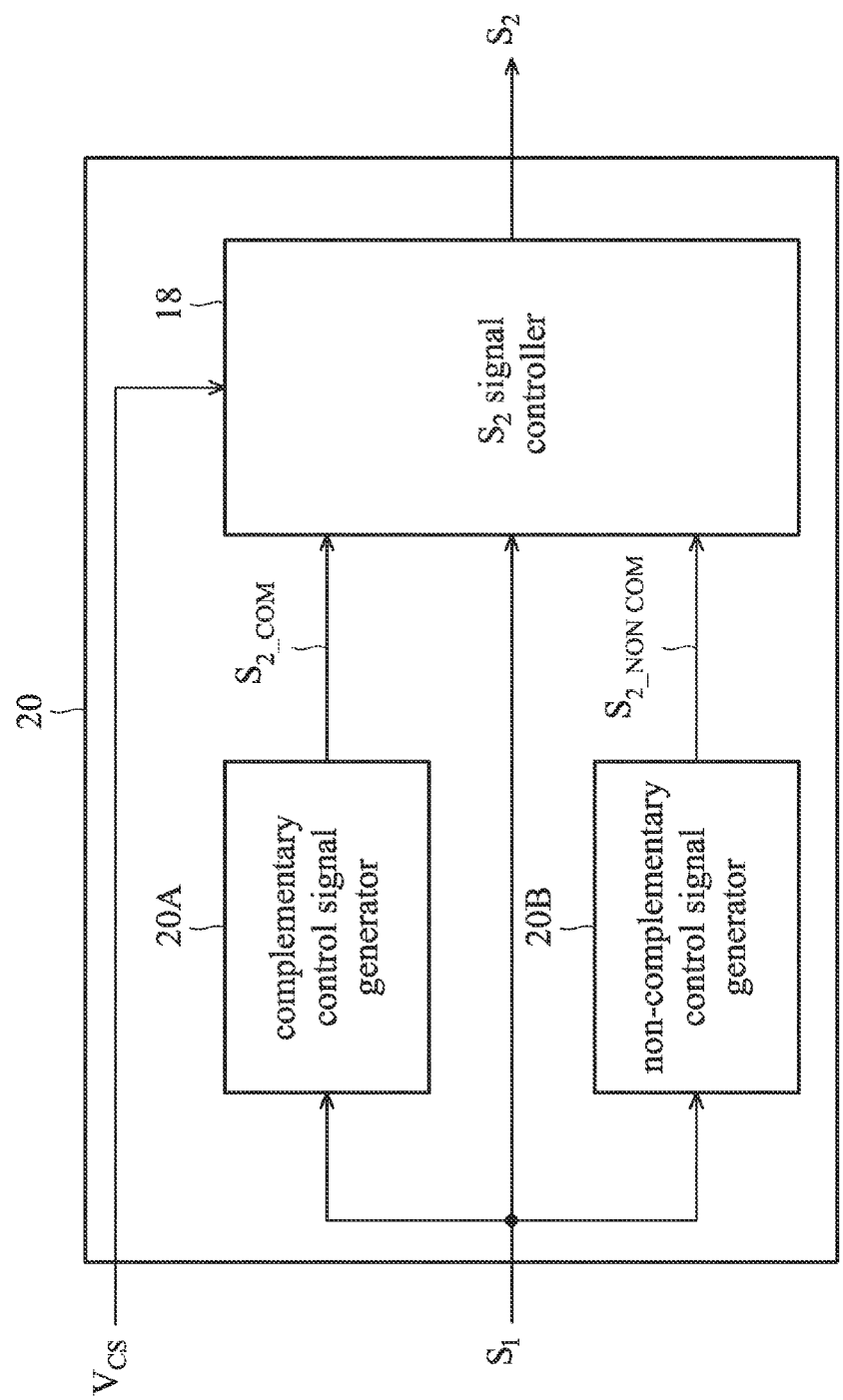
FIG. 6 is a block diagram of a second switch signal control circuit in the control circuit of FIG. 5 according to an embodiment of an active-clamp flyback converter.

FIG. 5 shows a block diagram of the control circuit 2 according to an embodiment. The control circuit 2 includes a feedback and PWM control circuit 22 generating the first switch signal S1, and a second switch signal control circuit 20 generating the second switch signal S2 according to the current sensing signal VCS and the first switch signal S1. The feedback and PWM control circuit 22 generates the first switch signal S1 according to the output voltage VO and the current sensing signal VCS that can be understood by those skilled in the art, a detailed description thereof is omitted for brevity. FIG. 6 shows a block diagram of the second switch signal control circuit 20 according to an embodiment. The second switch signal control circuit 20 comprises a complementary control signal generator 20A, a non-complementary control signal generator 20B, and an S2 signal controller 18. The complementary control signal generator 20A and the non-complementary control signal generator 20B generate a signal S2_COM in the complementary control mode and a signal S2_NON COM in the non-complementary control mode, respectively according to the current sensing signal VCS and the first switch signal S1. The S2 signal controller 18 selectively outputs the signal S2_COM or the signal S2_NON COM and regard it as the second switch signal S2. That is to say, the S2 signal controller 18 selectively generates the second switch signal S2 in a complementary control mode or a non-complementary control mode according to the current sensing signal VCS and the first switch signal S1.

Figure 7:
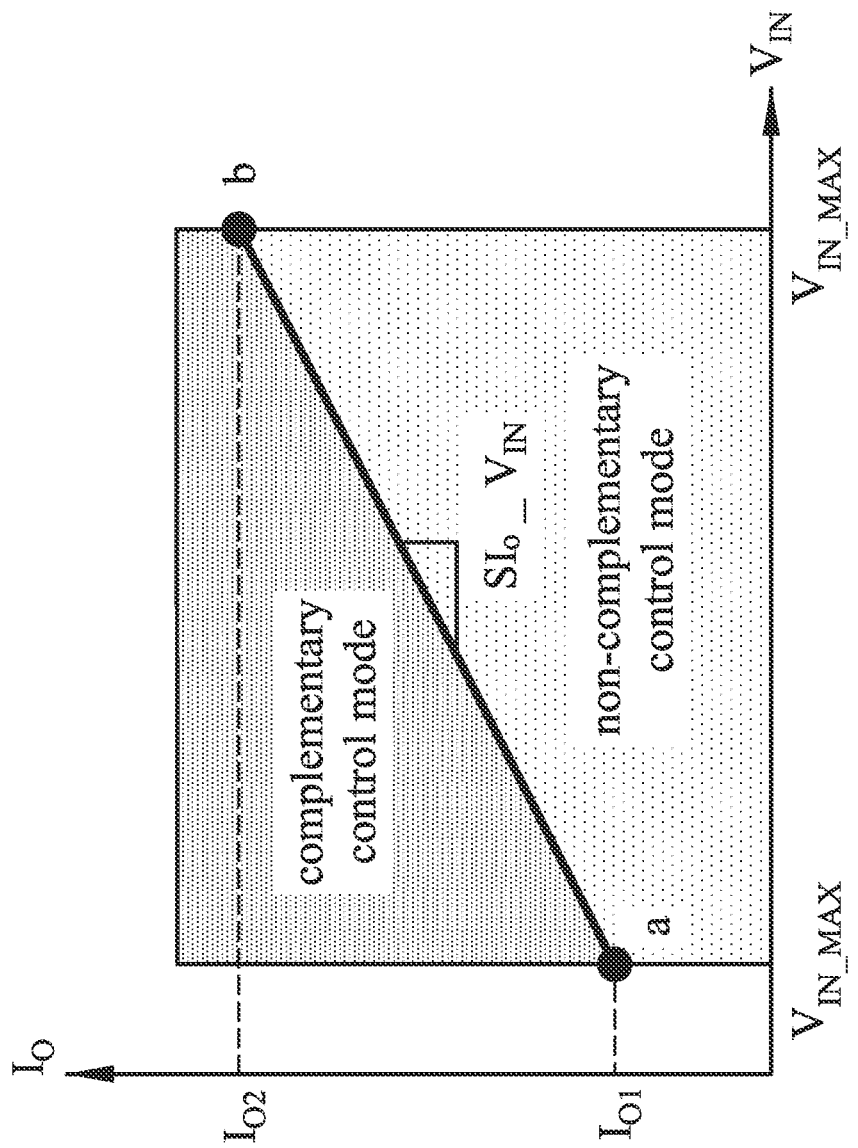
FIG. 7 shows the corresponding operating area of an output current against an input voltage.

The current sensing signal $V_{CS}$ is associated to the ratio of the output current $I_O$ to the input voltage $V_{IN}$. The corresponding operating area of the output current $I_O$ against the input voltage $V_{IN}$ is shown in FIG. 7, where the curve a-b is used for the threshold of changing control mode. It can be found that curve a-b is determined by operating points a and b and a slope $SI_{O\_}V_{IN}$. So, the equation of the curve a-b can be expressed as $$I_O = SI_{o\_}V_{IN} \cdot V_{IN} + \frac{V_{IN\_MAX}I_{O1} - V_{IN\_MIN}I_{O2}}{V_{IN\_MAX} - V_{IN\_MIN}} \quad (1)$$

According to the status of output current $I_O$ and input voltage $V_{IN}$, we can determine the desired control mode based on the following criteria.

$$\frac{I_O}{V_{IN}} - \frac{V_{IN\_MAX}I_{O1} - V_{IN\_MIN}I_{O2}}{V_{IN\_MAX} - V_{IN\_MIN}} \cdot \frac{1}{V_{IN}} > SI_{o\_}V_{IN}, \quad (2)$$

Complementary $$\frac{I_O}{V_{IN}} - \frac{V_{IN\_MAX}I_{O1} - V_{IN\_MIN}I_{O2}}{V_{IN\_MAX} - V_{IN\_MIN}} \cdot \frac{1}{V_{IN}} < SI_{l\_}V_{IN},$$

Noncomplementary

The optimal design for the curve a-b is defined as the efficiency of complementary control mode equal to the efficiency of non-complementary control mode. In addition, when the power converter operates in complementary control mode and its operating point (Io, Vin) approaches the threshold, the power converter operates as a DCM active-clamp flyback, as shown in FIG. 3B. So, a primary side peak current $I_{PK}$ can be obtained as $$I_{PK} = \frac{V_{IN}dT_S}{2L_M} + \frac{P_{IN}}{V_{IN}d} = \frac{V_{IN}dT_S}{2L_M} + \frac{V_O I_O}{V_{IN}d\eta} \quad (3)$$

where the primary side peak current $I_{PK}$ is related to the current sensing voltage $V_{CS}$, $T_S$ represents switching period, $P_{IN}$ represents input power, $L_M$ represents transformer primary side inductance, $\eta$ represents conversion efficiency of the power converter, and d represents the duty ratio and is ruled by:

$$d = \frac{npV_O}{npV_O + nsV_{IN}} \quad (4)$$

where np represents turns number of the primary winding $N_P$ of the transformer 10, and ns represents turns number of the secondary winding $N_S$ of the transformer 10.

To obtain the information of $I_O/V_{IN}$, we can multiply equation (3) by (d·(1−d)) to yield the threshold of changing from complementary to non-complementary control mode as below.

$$K_{S1} = I_{PK} \cdot d \cdot (1-d) = \left(\frac{V_{IN}dT_S}{2L_M} + \frac{V_O I_O}{V_{IN}d\eta}\right) \cdot d \cdot (1-d) \quad (5)$$

When the converter operates in non-complementary control mode, the operation and waveforms of first switch $Q_1$ are similar to the DCM flyback, as shown in FIG. 4B. So, the primary side peak current $I_{PK}$ can be obtained as $$I_{PK} = \frac{2}{d} \cdot I_{IN} = \frac{2}{d} \cdot \frac{P_{IN}}{V_{IN}} = \frac{2}{d} \cdot \frac{V_O I_O}{V_{IN}\eta} \quad (6)$$

where $I_{IN}$ represents an input current of the power supply and the duty ratio d is ruled by $$d = \frac{1}{V_{IN}}\sqrt{\frac{2V_O I_O L_M f_s}{\eta}} \quad (7)$$

To obtain the information of IO/VIN, we can multiply equation (8) by (d·(1−d)) to yield the threshold of changing from non-complementary to complementary control mode.

$$K_{S2} = I_{PK} \cdot d \cdot (1-d) \quad (8)$$

Substitute equation (6) into equation (8), equation (8) can be rearranged as $$K_{S2} = \frac{2V_O I_O}{V_{IN}d\eta} \cdot d \cdot (1-d) \quad (9)$$

Therefore, according to the equations (5) and (9), the $S_2$ signal controller 18 (shown in FIG. 6) selectively generates the second switch signal $S_2$ in a complementary control mode or a non-complementary control mode according to the current sensing signal $V_{CS}$ and the first switch signal $S_1$.

Figure 8A:
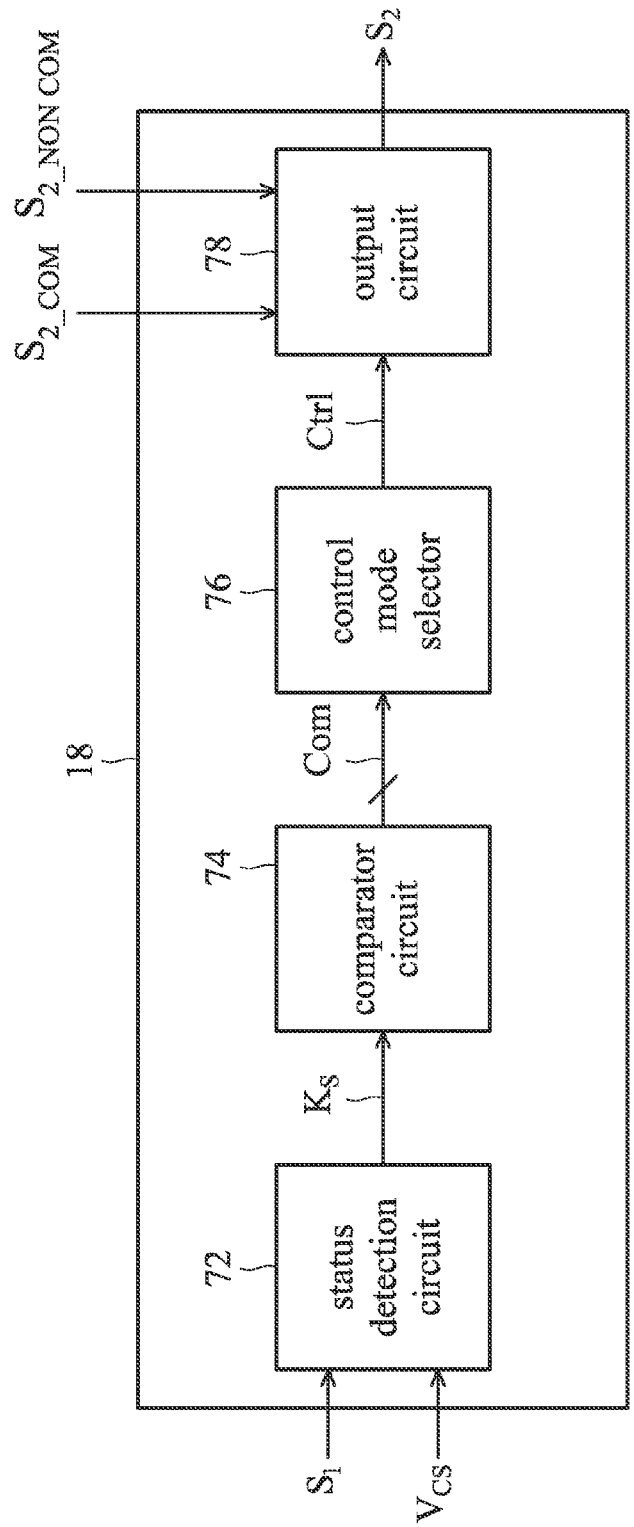
FIG. 8A is a block diagram of an embodiment of an $S_2$ signal controller in the second switch signal control circuit of FIG. 6.

FIG. 8A is a block diagram of an embodiment of the S2 signal controller 18. According to an embodiment of the disclosure, the $S_2$ signal controller 18 comprises a status detection circuit 72, a comparator circuit 74, a control mode selector 76, and an output circuit 78. The status detection circuit 72 generates a status parameter $K_S$ according to the current sensing signal $V_{CS}$ and the first switch signal $S_1$. The comparator circuit 74 compares the status parameter $K_S$ with a first reference REF-H and a second reference REF-L to generate a comparison result Com. The control mode selector 76 generates a control signal Ctrl in response to the comparison result Com. According to the comparison result Com, the control mode selector 76 pulls the control signal Ctrl to a high level corresponding to the complementary control mode or pulls the control signal Ctrl to a low level corresponding to the non-complementary control mode. The output circuit 78 generates the second switch signal $S_2$ in the complementary control mode or in the non-complementary control mode in response to the control signal Ctrl.

Figure 8B:
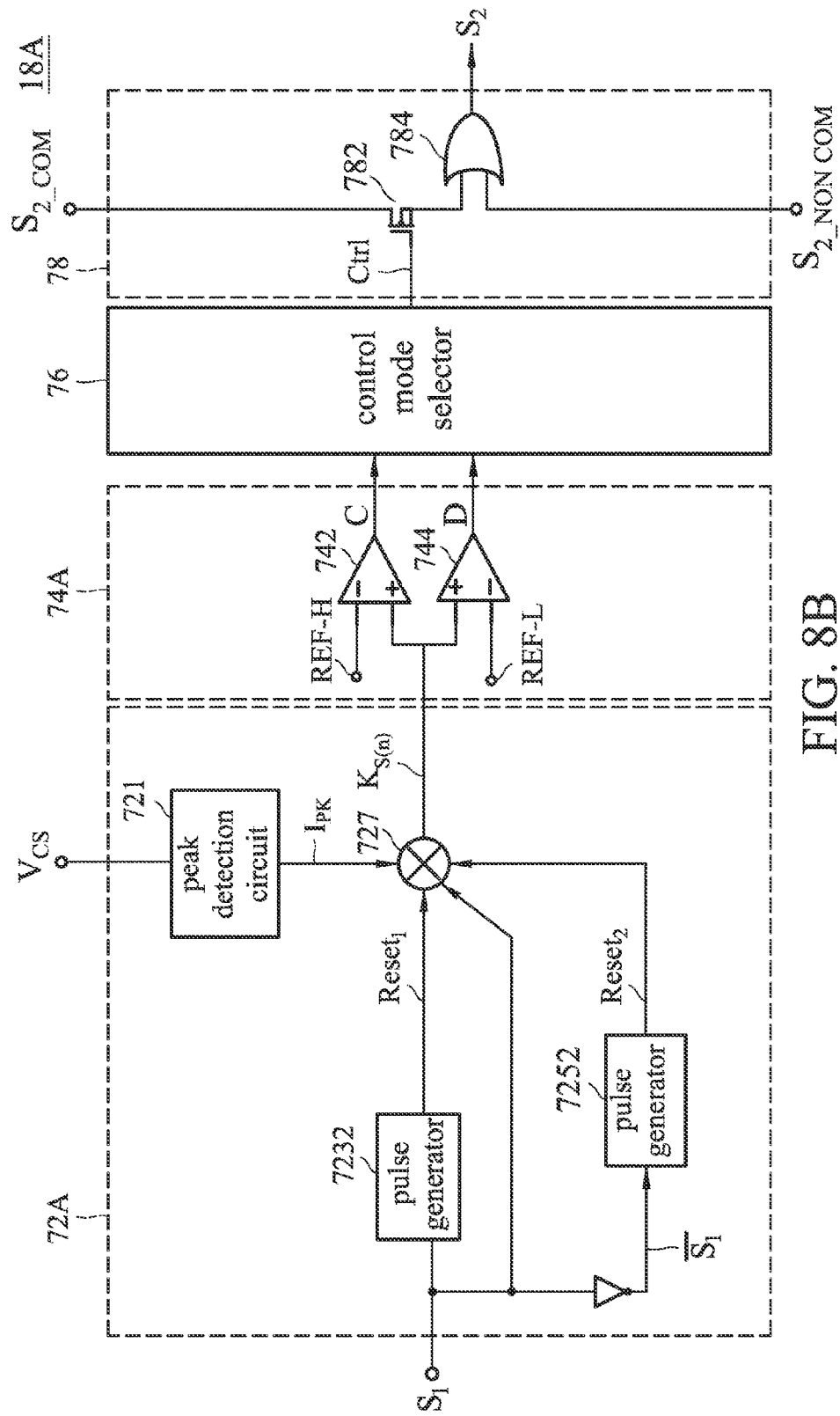
FIG. 8B is a detailed block diagram of an embodiment of the $S_2$ signal controller of FIG. 8A.

FIG. 8B is a detailed block diagram of an embodiment of the $S_2$ signal controller 18A. The status detection circuit 72A comprises pulse generators 7232 and 7252, a peak detection circuit 721, and a multiplier circuit 727. The peak detection circuit 721 detects the primary side peak current $I_{PK}$. In an embodiment, the information of the primary side peak current $I_{PK}$ can be detected by the current sensing signal $V_{CS}$. The pulse generator 7232 generates a first sampling signal Reset₁ according to the first switch signal $S_1$, and the pulse generator 7252 generates a second sampling signal Reset₂ according to the inverse of the first switch signal $S_1$. According to the current sensing signal $V_{CS}$ and the first switch signal $S_1$, the multiplier circuit 727 multiplies the primary side peak current $I_{PK}$ by the duty ratio d and the inverse of duty ratio (1−d) to generate the status parameter $K_S(n)$.

The comparator circuit 74A comprises a first comparator 742 and a second comparator 744. The first comparator 742 comprises a first positive terminal receiving the status parameter $K_S(n)$, a first negative terminal receiving the first reference REF-H, and a first output terminal outputting a first output signal C. The second comparator 744 comprises a second positive terminal receiving the status parameter $K_S(n)$, a second negative terminal receiving the second reference REF-L, and a second output terminal outputting a second output signal D. Therefore, the comparison result Com is generated according to the first output signal C and the second output signal D. In an embodiment of the disclosure, the first reference REF-H can be the parameter $K_{S1}$ (shown in equation (5)), and the second reference REF-L can be the parameter $K_{S2}$ (shown in equation (9)). In addition, the second sampling signal Reset₂ is used to sample $I_{PK}·(1-d)·d$ and treat as a current status of the status parameter Ks. The first sampling signal Reset₁ is used to sample the previous status of the status parameter Ks. In an embodiment of the disclosure, the status parameter Ks(n) represents the current state, and the status parameter $K_S(n-1)$ represents the previous state.

The control mode selector 76 pulls the control signal Ctrl to a high level corresponding to the complementary control mode or pulls the control signal Ctrl to a low level corresponding to the non-complementary control mode according to the comparison result Com. In an embodiment, the control mode selector 76 pulls the control signal Ctrl to a high level when the status parameter $K_S(n)$ exceeds the first reference REF-H and the second reference REF-L, for example, the first output signal C and the second output signal D are both in a high logic level. In addition, the control mode selector 76 pulls the control signal Ctrl to a low level when the status parameter $K_S(n)$ is less than the first reference REF-H and the second reference REF-L, for example, the first output signal C and the second output signal D are both in a low logic level. In addition, the logic level of the control signal Ctrl is maintained when the status parameter $K_S(n)$ is between the first reference REF-H and the second reference REF-L, specifically, the control mode selector 76 will not change the control signal Ctrl.

The output circuit 78 may comprise a transistor 782 and an OR logic gate 784. In an embodiment, the transistor 782 can be an NMOS transistor, the drain of the transistor 782 receives the signal $S_{2\_COM}$. The gate of the transistor 782 is couple to the control mode selector 76. The source of the transistor 782 is coupled to a first input of the OR logic gate 784. A second input of the OR logic gate 784 receives the signal $S_{2\_NON\_COM}$. As the gate of the transistor 782 receives the control signal Ctrl with a high logic level, the transistor 782 is turned on, and the OR logic gate 784 outputs the second switch signal $S_2$ according to the signal $S_{2\_COM}$. As the gate of the transistor 782 receives the control signal Ctrl with a low logic level, the transistor 782 is turned off and the OR logic gate 784 outputs the second switch signal $S_2$ according to the signal $S_{2\_NON\_COM}$. In other words, the output circuit 78 selectively generates the second switch signal $S_2$ in the complementary control mode or the non-complementary control mode.

Figure 8C:
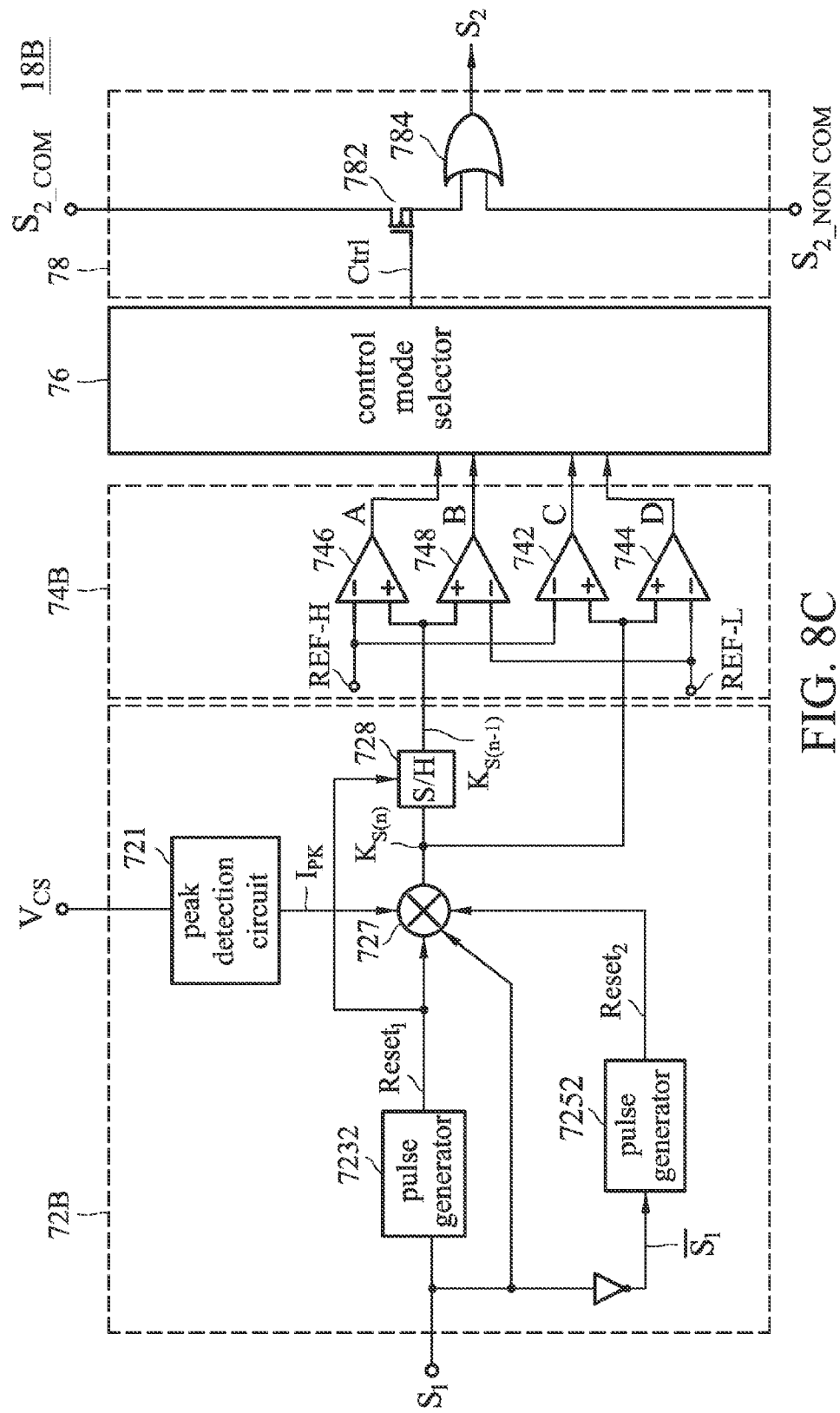
FIG. 8C is a detailed block diagram of another embodiment of the $S_2$ signal controller of FIG. 8A.

FIG. 8C is a detailed block diagram of another embodiment of the $S_2$ signal controller 18B. In this figure, like numerals are used to designate components like or equivalent to the preceding figures. The difference between the status detection circuit 72B in FIG. 8C and the status detection circuit 72A in FIG. 8B is that a sample and hold (S/H) circuit 728 is added. The sample and hold circuit 728 generates the previous state of the status parameter $K_S$, where the status parameter $K_S(n)$ represents the current state, and the status parameter $K_S(n-1)$ represents the previous state.

In addition, the difference between the comparator circuit 74B in FIG. 8C and the comparator circuit 74A in FIG. 8B is that a third comparator 746 and a fourth comparator 748 are added. The third comparator 746 comprises a third positive terminal receiving the status parameter $K_S(n-1)$, a third negative terminal receiving the first reference REF-H, and a third output terminal outputting a third output signal A. The fourth comparator 748 comprises a fourth positive terminal receiving the status parameter $K_S(n-1)$, a fourth negative terminal receiving the second reference REF-L, and a fourth output terminal outputting a fourth output signal B. As mentioned, the first reference REF-H can be the parameter $K_{S1}$ (shown in equation (5)), and the second reference REF-L can be the parameter $K_{S2}$ (shown in equation (9)).

Figure 9:
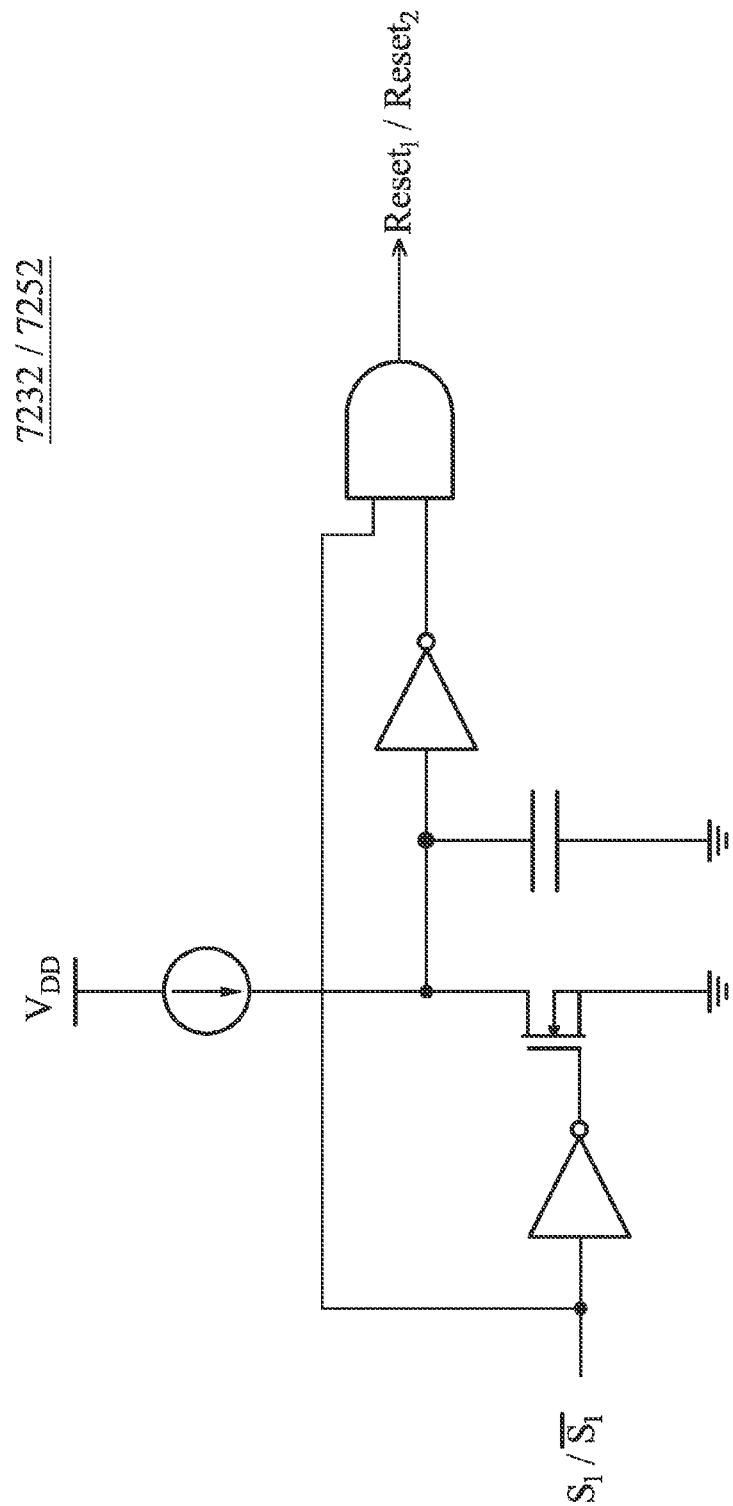
FIG. 9 is a circuit diagram of an embodiment of a pulse generator in a status detection circuit of at least one of FIGS. 8B-8C.
Figure 10:
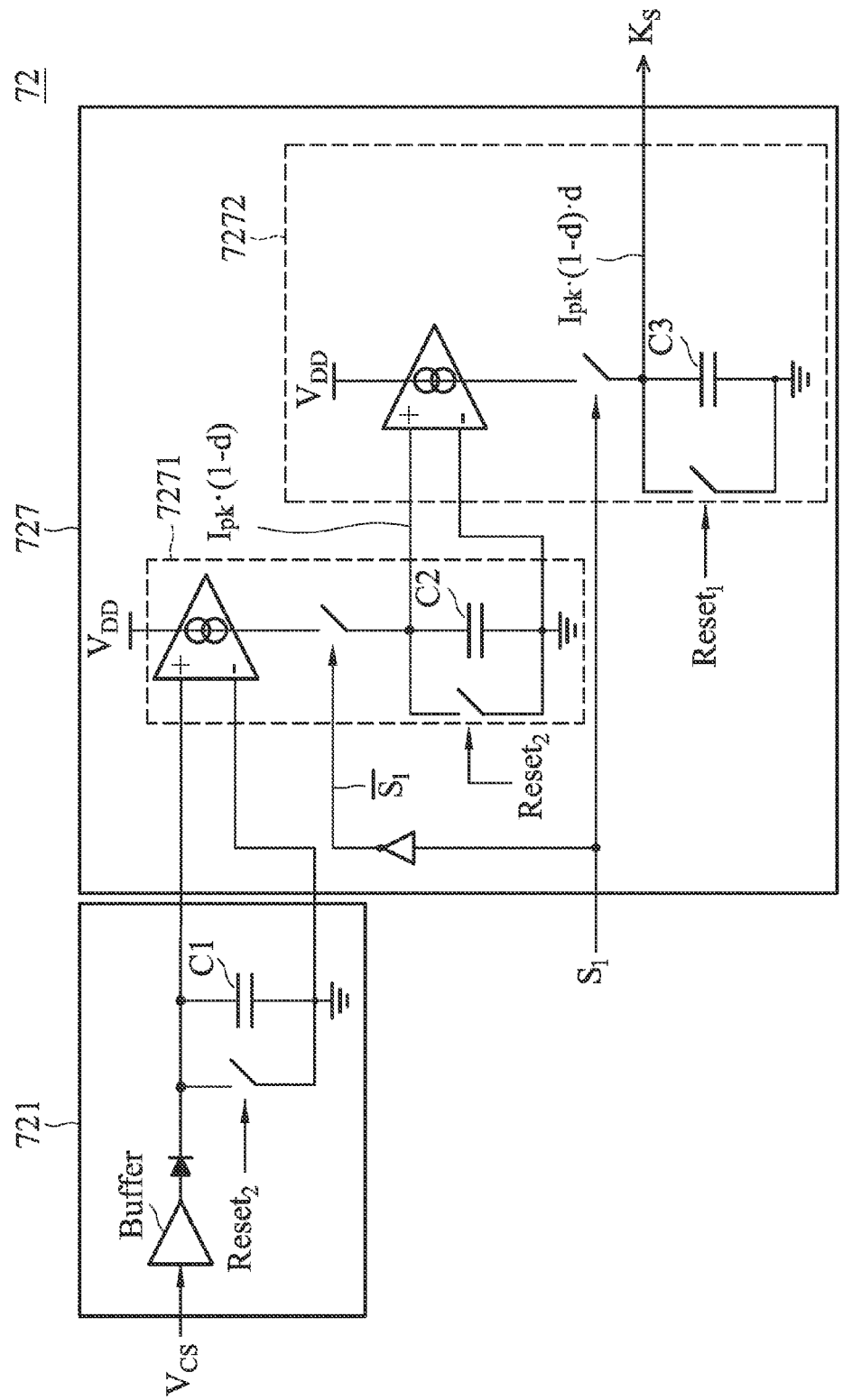
FIG. 10 is a circuit diagram of an embodiment of a peak detection circuit and a multiplier circuit of the status detection circuit of at least one of FIGS. 8B-8C to generate a status parameter.

FIG. 9 is a circuit diagram of an embodiment of the pulse generator 7232 to generate the first sampling signal Reset₁ and the pulse generator 7252 to generate the second sampling signal Reset₂. FIG. 10 is a circuit diagram of an embodiment of the peak detection circuit 721 and the multiplier circuit 727 to generate the status parameter $K_S$. Since the functionality and operation of the pulse generator 7232, the pulse generator 7252, the peak detection circuit 721 and the multiplier circuit 727 can be understood from FIGS. 9~10 by those skilled in the art, a detailed description thereof is omitted for brevity. As shown in FIG. 10, the switches in the peak detection circuit 721 and the multiplier circuit 727 are switched according to the first sampling signal Reset₁, the second sampling signal Reset₂, and the first switch signal $S_1$. That is to say, the multiplier circuit 727 multiplies the primary side peak current $I_{PK}$ by the duty ratio d and the inverse of duty ratio (1−d) to generate the status parameter $K_S$ according to the first sampling signal Reset₁, the second sampling signal Reset₂, and the first switch signal $S_1$. In addition, the information of $I_{PK}·(1-d)$ can be obtained by a multiplier 7271 and the information of $I_{PK}·(1-d)·d$ can be obtained by another multiplier 7272.

Figure 11:
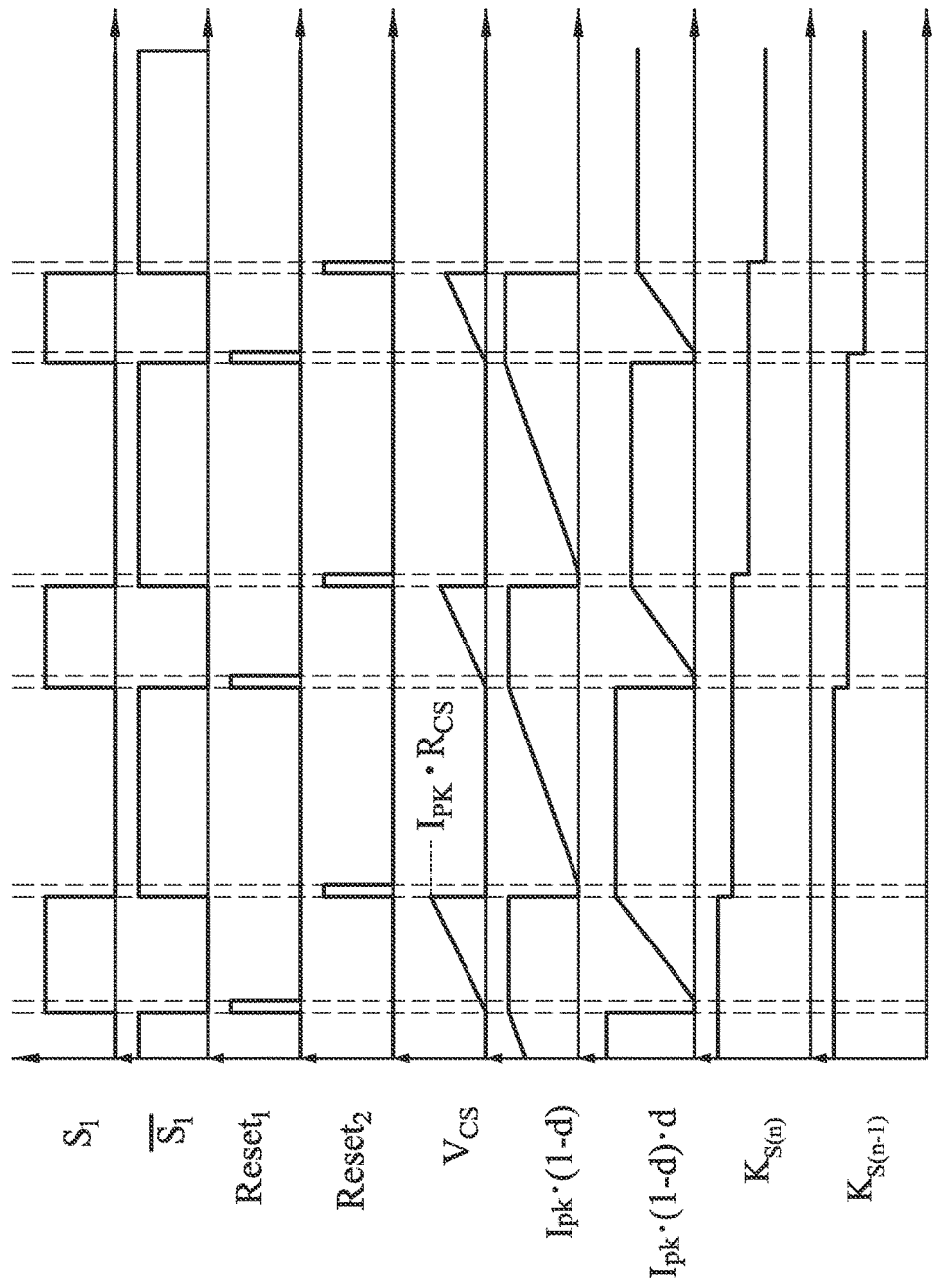
FIG. 11 shows an embodiment of waveforms of signals of the status detection circuit of FIG. 8C.

FIG. 11 shows an embodiment of the waveforms of the signals of the status detection circuit 72B (show in FIG. 8C). As shown in FIG. 11, the first sampling signal Reset' is the detection signal for the rising edge of the first switch signal $S_1$, and the second sampling signal Reset₂ is the detection signal for the rising edge of the inverse of the first switch signal $S_1$. In the duty-on time, the information of the primary side peak current $I_{PK}$ is detected by the current sensing signal $V_{CS}$. In the duty-off time, the information of $I_{PK}·(1-d)$ can be obtained by the multiplier 7271 (shown in FIG. 10). In the duty-on time of next switching cycle, the information of $I_{PK}·(1-d)·d$ can be obtained by the multiplier 7272 (shown in FIG. 10). In addition, the second sampling signal Reset₂ is used to sample $I_{PK}·(1-d)·d$ and treat as the current status $K_S(n)$. The first sampling signal Reset₁ is used to sample the previous status of $K_S$, i.e. $K_S(n-1)$.

Figure 12:
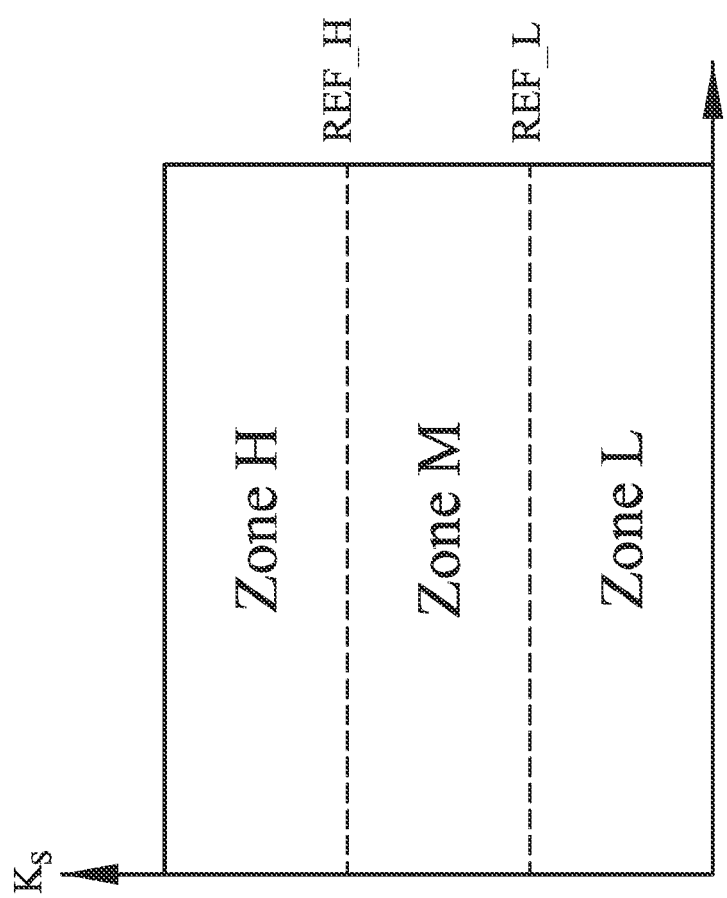
FIG. 12 shows relationship of the next control mode and a value of a status parameter.

FIG. 12 shows relationship of the next control mode and a value of a status parameter KS. When the status parameter KS exceeds the first reference REF-H, the status parameter KS is belonging to the Zone H, when the status parameter KS is lower than the second reference REF-L, the status parameter KS is belonging to the Zone L, and when the status parameter KS is between the first reference REF-H and the second reference REF-L, the status parameter KS is belonging to the Zone M. The Zone H is a higher level than the Zone M. The Zone M is a higher level than the Zone L. FIG. 13 shows the relationship of the next control mode and the conditions of the comparison result Com. When the status parameter KS stays in the Zone H or goes from the lower level to the higher level, the next control mode will be the complementary control mode, when the status parameter KS stays in the Zone L or goes from a higher level to a lower level, the next control mode will be the non-complementary control mode, and when the status parameter KS stays in the Zone M, the next control mode will be the same as the previous control mode, i.e. no change. For example (referring to FIG. 13), as the previous state of the status parameter KS(n−1) is in the Zone L and the current state of the status parameter KS(n) is in the Zone H, the condition of output signals (A,B,C,D) is (0,0,1,1). Thus, the next control mode will be the complementary control mode. Therefore, the comparison result Com is generated by conditions of the first output signal C, the second output signal D, the third output signal A and the fourth output signal B according to FIG. 13.

Figure 14:
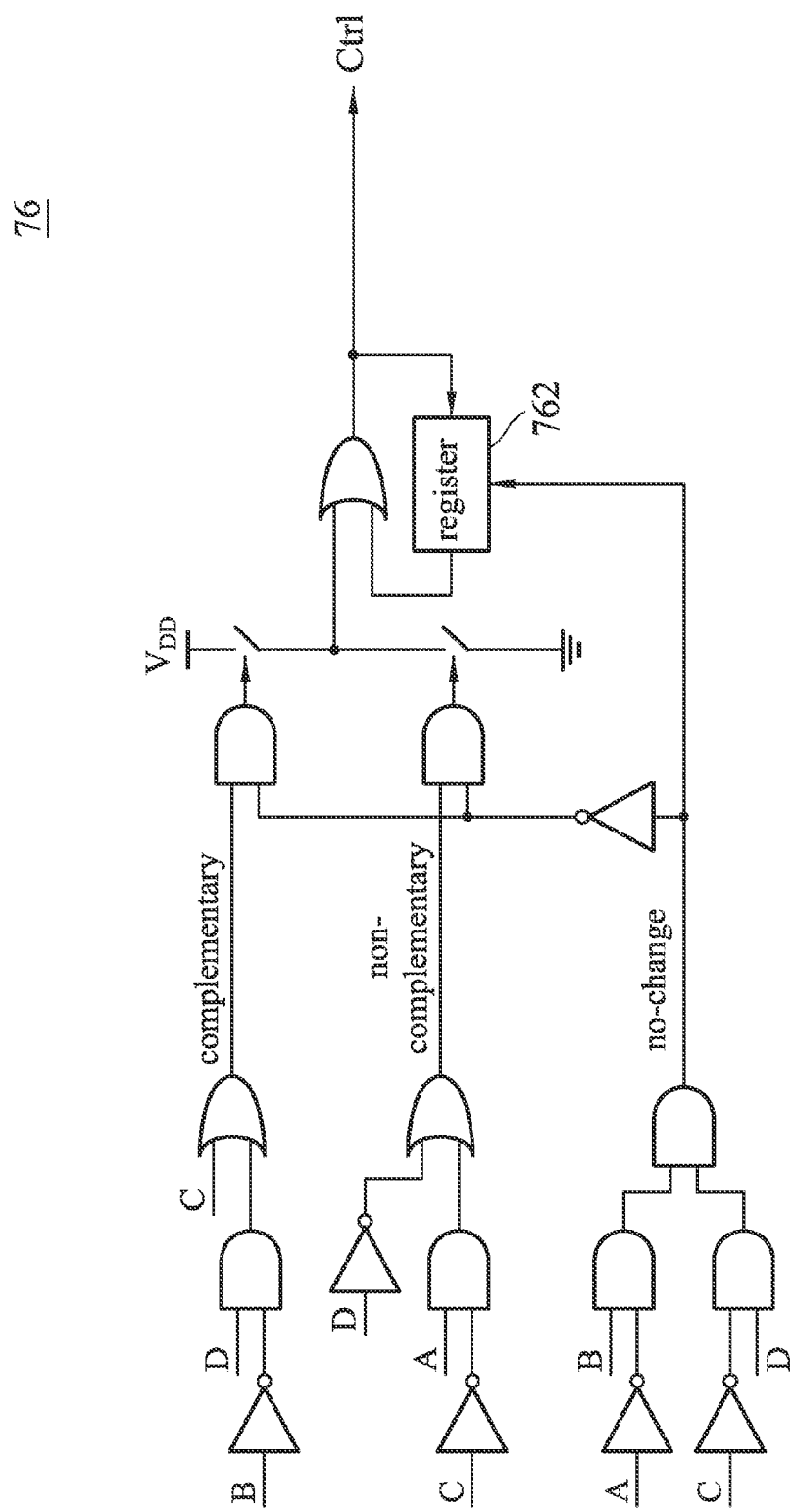
FIG. 14 is a circuit diagram of an embodiment of a control mode selector in the status detection circuit of at least one of FIGS. 8A-8C.

FIG. 14 is a circuit diagram of an embodiment of the control mode selector 76. The control mode selector 76 pulls the control signal Ctrl to a high level corresponding to the complementary control mode or pulls the control signal Ctrl to a low level corresponding to the non-complementary control mode according to the comparison result Com. Since the functionality and operation of the control mode selector 76 can be understood from FIG. 14 by those skilled in the art, a detailed description thereof is omitted for brevity. In this embodiment, a register 762 is employed to store the previous control mode, and the decision of the control mode for the second switch signal $S_2$ is further according to the two continuous states of the status parameter $K_S$.

Figure 15:
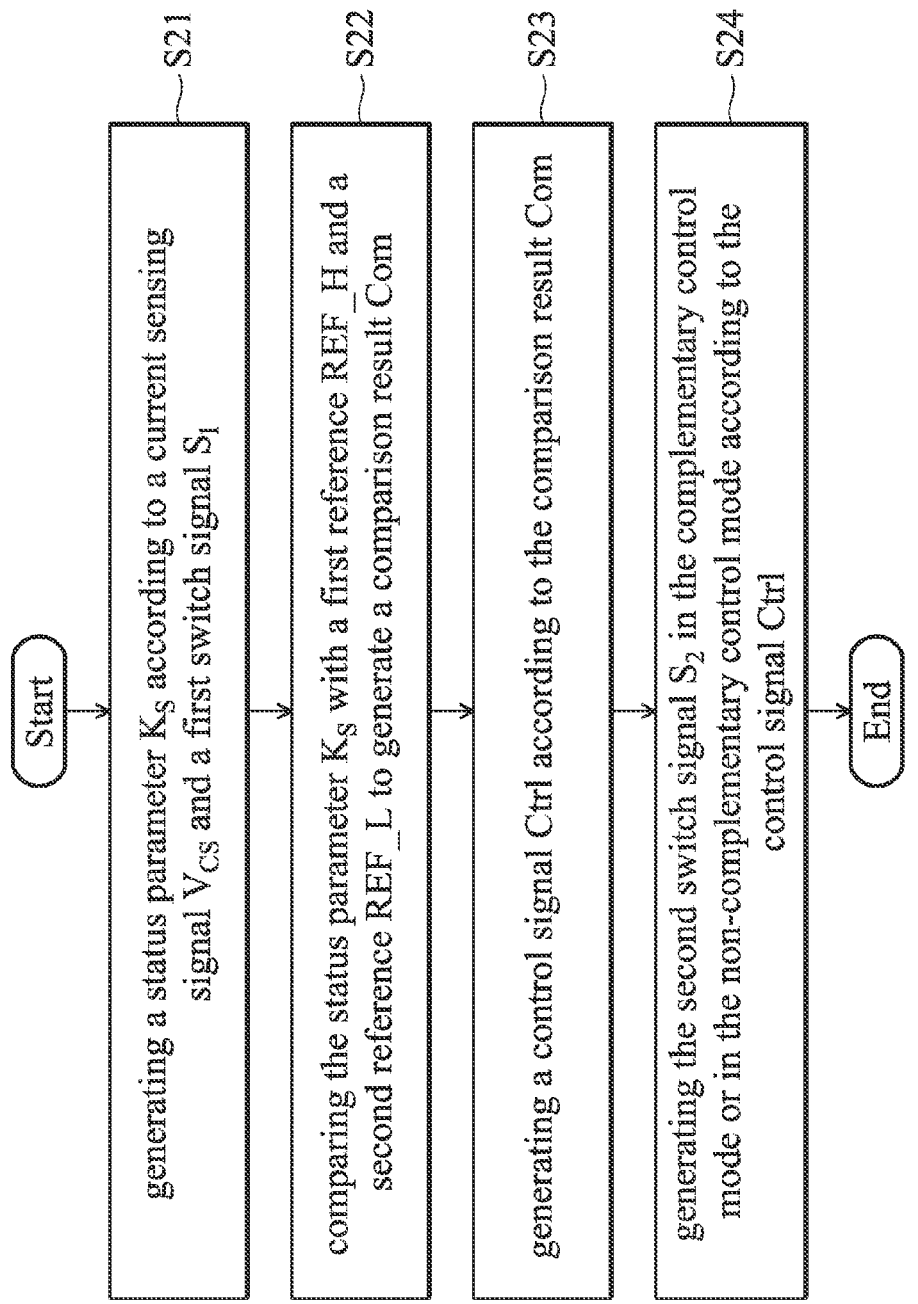
FIG. 15 is a flow chart of an embodiment to generate a second switch signal.

FIG. 15 is a flow chart of an embodiment to generate the second switch signal $S_2$. First, a status parameter $K_S$ is generated according to the current sensing signal Vcs and the first switch signal $S_1$ (step S21). Next, the status parameter $K_S$ is compared with a first reference REF-H and a second reference REF-L to generate a comparison result Com (step S22). Then, a control signal Ctrl is generated according to the comparison result Com (step S23). Finally, the second switch signal $S_2$ is generated in the complementary control mode or in the non-complementary control mode according to the control signal Ctrl (S24).

This disclosure proposes an adaptive control scheme for active-clamp flyback converters to achieve efficiency profile optimization. At heavy-load or low input condition, the complementary control mode is adopted to achieve ZVS turn-on for both the first switch device and the second switch device. At light-load or high input condition, the non-complementary control mode is adopted so that the second switch device is turned on only for a short time to reduce its circulating current. As a result, the switching loss and conduction loss of the second switch device can be effectively reduced and ZVS turn-on of the first switch device also can be achieved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An active-clamp flyback power converter comprising: a first switch device comprising a first switch and a parallel-connected first diode, coupled to a primary winding of a transformer and switched according to a first switch signal to switch the transformer for regulating an output voltage of the active-clamp flyback power converter; a second switch device comprising a second switch and a parallel-connected second diode, and switched according to a second switch signal for recycling leakage energy of the transformer and achieving a soft-switching of the first switch; a clamp capacitor connected in series with the second switch device to develop an active-clamp circuit, wherein the active-clamp circuit is coupled in parallel with the primary winding of the transformer; and a control circuit generating the first switch signal according to the output voltage and a current sensing signal, and selectively generating the second switch signal in a complementary control mode or a non-complementary control mode according to the current sensing signal and the first switch signal.

2. The active-clamp flyback power converter of claim 1, wherein the first switch and the second switch are complementarily switched in the complementary control mode, and the pulse width of the second switch signal in the non-complementary control mode is less than that in the complementary control mode.

3. The active-clamp flyback power converter of claim 1, wherein the control circuit comprises:
   a feedback and PWM control circuit generating the first switch signal according to the output voltage and the current sensing signal; and
   a switch signal control circuit receiving the first switch signal and the current sensing signal and generating the second switch signal according to the first switch signal and the current sensing signal.

4. The active-clamp flyback power converter of claim 3, wherein switch signal control circuit comprising:
   a complementary control signal generator receiving the first switch signal and generating a first signal in the complementary control mode;
   a non-complementary control signal generator receiving the first switch signal and generating a second signal in the non-complementary control mode; and
   a signal controller receiving the first signal and the second signal and selectively outputs the first signal or the second signal to serve as the second switch signal according to the first switch signal and the current sensing signal.

5. The active-clamp flyback power converter of claim 4, wherein signal controller comprising:
   a status detection circuit generating a first status parameter according to the current sensing signal and the first switch signal, wherein the first status parameter represents a current state of the active-clamp flyback power converter;
   a comparator circuit comparing the first status parameter with a first reference and a second reference, and generating a comparison result;
   a control mode selector generating a control signal in response to the comparison result; and
   an output circuit receiving the first signal and the second signal, wherein the output circuit selectively outputs the first signal or the second signal to serve as the second switch signal in response to the receiving of the control signal with a high logic level or a low logic level.

6. The active-clamp flyback power converter of claim 5, wherein the control mode selector pulls the control signal to the high logic level when the first status parameter exceeds the first reference and pulls the control signal to the low logic level when the first status parameter is less than the second reference, and a logic level of the control signal is maintained when the first status parameter is between the first reference and the second reference.

7. The active-clamp flyback power converter of claim 5, wherein the status detection circuit further generates a second status parameter which represents a previous state of the active-clamp flyback power converter, the comparator circuit generates the comparison result by comparing the first status parameter with the first reference and the second reference and comparing the second status parameter with the first reference and the second reference.

8. A control circuit for an active-clamp flyback power converter, comprising:
 a complementary control signal generator generating a first signal according to a first switch signal, wherein the first switch signal is coupled to a transformer of the active-clamp flyback power converter for regulating an output voltage of the active-clamp flyback power converter;
 a non-complementary control signal generator generating a second signal according to the first switch signal; and
 a signal controller receiving the first signal and the second signal and controlled by the first switch signal and a current sensing signal, wherein the signal controller selectively outputs the first signal or the second signal to serve as a second switch signal according to the first switch signal and the current sensing signal, and
 wherein the second switch signal is coupled for recycling leakage energy of the transformer and achieving a soft-switching of a power switch of the active-clamp flyback power converter.

9. The control circuit of claim 8, wherein signal controller comprising:
 a status detection circuit generating a first status parameter according to the current sensing signal and the first switch signal, wherein the first status parameter represents a current state of the active-clamp flyback power converter;
 a comparator circuit comparing the first status parameter with a first reference and a second reference, and generating a comparison result;
 a control mode selector generating a control signal in response to the comparison result; and
 an output circuit receiving the first signal and the second signal,
 wherein the output circuit selectively outputs the first signal or the second signal to serve as the second switch signal according to the first switch signal in response to the receiving of the control signal with a high logic level or a low logic level.

10. The control circuit of claim 9, wherein the control mode selector pulls the control signal to the high logic level when the first status parameter exceeds the first reference and pulls the control signal to the low logic level when the first status parameter is less than the second reference, and a logic level of the control signal is maintained when the first status parameter is between the first reference and the second reference.

11. The control circuit of claim 9, wherein the status detection circuit further generates a second status parameter which represents a previous state of the active-clamp flyback power converter, the comparator circuit generates the comparison result by comparing the first status parameter with the first reference and the second reference and comparing the second status parameter with the first reference and the second reference.

12. A control circuit of an active-clamp flyback power converter comprising:
 a status detection circuit generating a first status parameter according to a current sensing signal and a first switch signal, wherein the first status parameter represents a current state of the active-clamp flyback power converter, the first switch signal is coupled to a transformer of the active-clamp flyback power converter for regulating an output voltage of the active-clamp flyback power converter;
 a comparator circuit comparing the first status parameter with a first reference and a second reference, and generating a comparison result;
 a control mode selector generating a control signal in response to the comparison result; and
 an output circuit receiving a first signal and a second signal,
 wherein the output circuit selectively outputs the first signal or the second signal to serve as a second switch signal according to the first switch signal in response to the receiving of the control signal with a high logic level or a low logic level, and
 wherein the second switch signal is coupled for recycling leakage energy of the transformer and achieving a soft-switching of a power switch of the active-clamp flyback power converter.

13. The control circuit of claim 12, wherein the control mode controller pulls the control signal to the high logic level when the first status parameter exceeds the first reference and pulls the control signal to the low logic level when the first status parameter is less than the second reference, and a logic level of the control signal is maintained when the first status parameter is between the first reference and the second reference.

14. The control circuit of claim 12, wherein the status detection circuit further generates a second status parameter which represents a previous state of the active-clamp flyback power converter, the comparator circuit generates the comparison result by comparing the first status parameter with the first reference and the second reference and comparing the second status parameter with the first reference and the second reference.

15. The control circuit of claim 12, wherein the status detection circuit comprises:
 a first pulse generator generating a first sampling signal according to the first switch signal;
 a second pulse generator generating a second sampling signal according to an inverse signal of the first switch signal;
 a peak detection circuit coupled to detect a primary side peak current of the transformer; and
 a multiplier circuit controlled by the first switch signal, the first sampling signal and the second sampling signal to generate a duty ratio and an inverse of the duty ratio and multiplying the primary side peak current by the duty ratio and an inverse of the duty ratio for generating the first status parameter, wherein the duty ratio is associated to an input voltage and the output voltage of the active-clamp flyback power converter.

16. The control circuit of claim 12, wherein the status detection circuit comprises:
   a first pulse generator generating a first sampling signal according to the first switch signal;
   a second pulse generator generating a second sampling according to an inverse signal of the first switch signal;
   a peak detection circuit coupled to detect a primary side peak current of the transformer; and
   a multiplier circuit generating a duty ratio according to the first switch signal, the first sampling signal, and the second sampling signal and multiplying the primary side peak current by the duty ratio and an inverse of the duty ratio for generating the first status parameter,
   wherein the duty ratio is associated to an input voltage and the output voltage of the active-clamp flyback power converter.

17. A control method for an active-clamp flyback power converter comprising:
   generating a status parameter according to a current sensing signal and a first switch signal, wherein the first switch signal is coupled to a transformer of the active-clamp flyback power converter for regulating an output voltage of the active-clamp flyback power converter;
   comparing the status parameter with a first reference and a second reference to generate a comparison result;
   generating a control signal according to the comparison result; and
   generating a second switch signal in a complementary control mode or in a non-complementary control mode according to the control signal,
   wherein the second switch signal is coupled for recycling leakage energy of the transformer and achieving a soft-switching of the first switch.

18. The control method of claim 17, wherein the step of generating the second switch signal further comprises:
   generating a first signal in the complementary control mode;
   generating a second signal in the non-complementary control mode; and
   selectively outputting the first signal or the second signal to serve as the second switch signal according to the control signal.

19. The control method of claim 17, wherein the control signal is pulled to a high logic level when the status parameter exceeds the first reference and pulled to a low logic level when the status parameter is less than the second reference, and a logic level of the control signal is maintained when the status parameter is between the first reference and the second reference.

* * * * *